United States Patent
Liu et al.

(10) Patent No.: US 8,563,169 B2
(45) Date of Patent: *Oct. 22, 2013

(54) SELF ASSEMBLED MULTI-LAYER NANOCOMPOSITE OF GRAPHENE AND METAL OXIDE MATERIALS

(75) Inventors: Jun Liu, Richland, WA (US); Ilhan A. Aksay, Princeton, NJ (US); Daiwon Choi, Richland, WA (US); Rong Kou, Richland, WA (US); Zimin Nie, Richland, WA (US); Donghai Wang, Richland, WA (US); Zhenguo Yang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,741

(22) Filed: Aug. 14, 2012

(65) Prior Publication Data

US 2012/0305165 A1    Dec. 6, 2012

Related U.S. Application Data

(62) Division of application No. 12/462,857, filed on Aug. 10, 2009.

(51) Int. Cl.
  *H01M 4/13* (2010.01)
  *H01M 4/02* (2006.01)
  *H01M 4/58* (2010.01)
  *H01M 4/60* (2006.01)

(52) U.S. Cl.
  USPC ..... 429/209; 429/212; 429/231.4; 429/231.5; 429/231.8

(58) Field of Classification Search
  USPC ............... 429/209, 212, 231.4, 231.5, 231.8
  See application file for complete search history.

(56) References Cited

U.S. PATENT DOCUMENTS

| | | | |
|---|---|---|---|
| 5,972,088 | A | 10/1999 | Krishnan et al. |
| 6,264,741 | B1 | 7/2001 | Brinker et al. |
| 6,492,014 | B1 | 12/2002 | Rolison et al. |
| 7,001,669 | B2 | 2/2006 | Lu et al. |
| 7,094,499 | B1 | 8/2006 | Hung |
| 7,176,245 | B2 | 2/2007 | Stucky et al. |

(Continued)

FOREIGN PATENT DOCUMENTS

| | | |
|---|---|---|
| CN | 1483212 | 3/2004 |
| CN | 1588679 | 3/2005 |

(Continued)

OTHER PUBLICATIONS

Nakahara et al. Journal of Materials Science vol. 29 1994 pp. 3193-3194 {full article available on request when available received}.*

(Continued)

*Primary Examiner* — Patrick Ryan
*Assistant Examiner* — Aaron Greso
(74) *Attorney, Agent, or Firm* — Klarquist Sparkman, LLP

(57) ABSTRACT

Nanocomposite materials having at least two layers, each layer consisting of one metal oxide bonded to at least one graphene layer were developed. The nanocomposite materials will typically have many alternating layers of metal oxides and graphene layers, bonded in a sandwich type construction and will be incorporated into an electrochemical or energy storage device.

15 Claims, 19 Drawing Sheets

(56) References Cited

U.S. PATENT DOCUMENTS

| | | | |
|---|---|---|---|
| 7,309,830 | B2 | 12/2007 | Zhang et al. |
| 7,623,340 | B1 | 11/2009 | Song et al. |
| 8,257,867 | B2 | 9/2012 | Liu et al. |
| 2002/0022122 | A1 | 2/2002 | Hirata et al. |
| 2002/0054995 | A1* | 5/2002 | Mazurkiewicz ............. 428/364 |
| 2003/0086859 | A1* | 5/2003 | Kawakami et al. ........ 423/447.1 |
| 2004/0120880 | A1 | 6/2004 | Zhang et al. |
| 2004/0131934 | A1 | 7/2004 | Sugnaux et al. |
| 2004/0137225 | A1 | 7/2004 | Balkus, Jr. et al. |
| 2004/0150140 | A1 | 8/2004 | Zhan et al. |
| 2006/0154071 | A1 | 7/2006 | Homma et al. |
| 2007/0092432 | A1 | 4/2007 | Prud'homme et al. |
| 2007/0158618 | A1 | 7/2007 | Song et al. |
| 2007/0212538 | A1 | 9/2007 | Niu |
| 2007/0281854 | A1 | 12/2007 | Harbour et al. |
| 2008/0063585 | A1 | 3/2008 | Smalley et al. |
| 2008/0258359 | A1* | 10/2008 | Zhamu et al. ................. 264/673 |
| 2008/0279756 | A1 | 11/2008 | Zhamu et al. |
| 2008/0302561 | A1 | 12/2008 | Prud'homme et al. |
| 2008/0312368 | A1 | 12/2008 | Prud'homme et al. |
| 2009/0117467 | A1 | 5/2009 | Zhamu et al. |
| 2009/0246625 | A1 | 10/2009 | Lu |
| 2009/0290897 | A1 | 11/2009 | Doshoda et al. |
| 2009/0291270 | A1 | 11/2009 | Zettl et al. |
| 2009/0297947 | A1 | 12/2009 | Deng et al. |
| 2009/0303660 | A1 | 12/2009 | Nair et al. |
| 2009/0305135 | A1 | 12/2009 | Shi et al. |
| 2010/0081057 | A1 | 4/2010 | Liu et al. |
| 2010/0143798 | A1 | 6/2010 | Zhamu et al. |
| 2010/0159366 | A1 | 6/2010 | Shao-Horn et al. |
| 2010/0176337 | A1 | 7/2010 | Zhamu et al. |
| 2011/0033746 | A1 | 2/2011 | Liu et al. |
| 2011/0045347 | A1 | 2/2011 | Liu et al. |
| 2011/0051316 | A1 | 3/2011 | Liu et al. |
| 2011/0052981 | A1 | 3/2011 | Lopez et al. |
| 2011/0111299 | A1 | 5/2011 | Liu et al. |
| 2012/0088158 | A1 | 4/2012 | Liu et al. |
| 2012/0295027 | A1 | 11/2012 | Liu et al. |
| 2012/0295096 | A1 | 11/2012 | Liu et al. |

FOREIGN PATENT DOCUMENTS

| | | | | |
|---|---|---|---|---|
| CN | 1793451 | 6/2006 | | |
| CN | 101048055 | 10/2007 | | |
| CN | 101139090 | 3/2008 | | |
| JP | H10-233211 | * 9/1998 | ............. | H01M 4/08 |
| WO | WO2007/015710 | 2/2007 | | |
| WO | WO2007/061945 | 5/2007 | | |
| WO | WO 2008/013380 | * 1/2008 | ............. | H01M 4/00 |
| WO | WO2008/106991 | 9/2008 | | |
| WO | WO 2008/143692 | * 11/2008 | ............. | C01B 31/00 |
| WO | WO2009/023051 | 2/2009 | | |
| WO | WO2009/085015 | 7/2009 | | |
| WO | WO2010/014215 | 2/2010 | | |
| WO | WO2010/030361 | 3/2010 | | |
| WO | WO2011/019764 | 2/2011 | | |
| WO | WO2011/019765 | 2/2011 | | |

OTHER PUBLICATIONS

Wang et al Journal of The Electrochemical Society A563-A570 2004.*
Murakami et al. (Materials Science forum vol. 445-446 2004 pp. 331-333 Abstract and Introduction).*
Lee (Journal of Power Sources vol. 90 2000 pp. 70-75).*
Wakihara (Lithium Ion Batteries Fundamentals and Performance; Wakihara et al. ed. 1998 New York Wiley).*
Bonard et al. (Advanced Materials 1997 vol. 9 No. 10 pp. 827-831).*
Kang et al. (Journal of the Korean Electrochemical Society 2002, vol. 5, No. 2, pp. 52-56 with USPTO English Translation.*
USP (Sodium Lauryl Sulfate MSDS USP Rockville MD May 24, 2004 and Oct. 28, 2010).*
Novosolov et al. (Science, Oct. 22, 2004 vol. 306 pp. 666-669).*
Aksay et al., "Biomimetic Pathways for Assembling Inorganic Thin Films," Science 273:892-898 (Aug. 1996).
Aricò et al., "Nanostructured materials for advanced energy conversion and storage devices," Nature Materials 4:366-377 (May 2005).
Armstrong et al., "$TiO_2$-B Nanowires," Angewandte Chemie—International Edition 43:2286-2288 (Apr. 2004).
Armstrong et al., "$TiO_2(B)$ Nanowires as an Improved Anode Material for Lithium-Ion Batteries Containing LiFePO4 or $LiNi_{0.5}Mn_{1.5}O_4$ Cathodes and a Polymer Electrolyte," Advanced Materials 18:2597-2600 (Oct. 2006).
Asefa et al., "Periodic mesoporous organosilicas with organic groups inside the channel walls," Nature 402:867-871 (Dec. 1999).
Atkin et al., "Self-Assembly of a Nonionic Surfactant at the Graphite/Ionic Liquid Interface," Journal of the American Chemical Society 127:11940-11941 (Aug. 2005).
Attard et al., "Mesoporous Platinum Films from Lyotropic Liquid Crystalline Phases," Science 278:838-840 (Oct. 1997).
Bagshaw et al., "Templating of Mesoporous Molecular Sieves by Nonionic Polyethylene Oxide Surfactants," Science 269:1242-1244 (Sep. 1995).
Baudrin et al., "Structural evolution during the reaction of Li with nano-sized rutile type TiO2 at room temperature," Electrochemistry Communications 9:337-342 (Feb. 2007).
Berger et al., "Electronic Confinement and Coherence in Patterned Epitaxial Graphene," Science 312:1191-1196 (May 2006).
Bonard et al., "Purification and Size-Selection of Carbon Nanotubes," Advanced Materials 9(10):827-831 (month unknown 1997).
Braun et al., "Semiconducting superlattices template by molecular assemblies," Nature 380:325-328 (Mar. 1996).
Chen et al., "Mechanically Strong, Electrically Conductive, and Biocompatible Graphene Paper," Advanced Materials 20:3557-3561 (Jul. 2008).
Chen et al., "Reducing Carbon in $LiFePO_4/C$ Composite Electrodes to Maximize Specific Energy, Volumetric Energy, and Tap Density," Journal of the Electrochemical Society 149(9):A1184-A1189 (Sep. 2002).
Choi et al., "Li-ion batteries from $LiFePO_4$ cathode and anatase/graphene composite anode for stationary energy storage," Electrochemistry Communications 12(3):378-381 (Jan. 2010).
Decher, "Fuzzy Nanoassemblies: Toward Layered Polymeric Multicomposites," Science 277(9):1232-1237 (Aug. 1997).
Dikin et al., "Preparation and characterization of graphene oxide paper," Nature 448:457-460 (Jul. 2007).
Dominko et al., "Impact of the Carbon Coating Thickness on the Electrochemical Performance of $LiFePO_4/C$ Composites," Journal of the Electrochemical Society, 152(3):A607-A610 (Jan. 2005).
Erjavec et al., "$RuO_2$-wired high-rate nanoparticulate $TiO_2$ (anatase): Suppression of particle growth using silica," Electrochemistry Communications, 10:926-929 (Jun. 2008).
Final Office action from U.S. Patent and Trademark Office for U.S. Appl. No. 12/852,794, mailed Jul. 3, 2012.
Franger et al., "Optimized Lithium Iron Phosphate for High-Rate Electrochemical Application," Journal of the Electrochemical Society, vol. 151, No. 7, pp. A1024-A1027 (May 2004).
Gòmez-Navarro et al., "Electronic Transport Properties of Individual Chemically Reduced Graphene Oxide Sheets," Nano Letters, 7(11):3499-3503 (Oct. 2007).
Goward et al., "Poly(pyrrole) and poly(thiophene)/vanadium oxide interleaved nanocomposites: positive electrodes for lithium batteries," Electrochimica Acta 43(10-11):1307-1303 (Apr. 1998).
Guo et al., "Superior Electrode Performance of Nanostructured Mesoporous $TiO_2$ (Anatase) through Efficient Hierarchical Mixed Conducting Networks," Advanced Materials 19:2087-2091 (Jul. 2007).
Herle et al., "Nano-network electronic conduction in iron and nickel olivine phosphates," Nature Materials 3:147-152 (Feb. 2004).
Hu et al., "High Lithium Electroactivity of Nanometer-Sized Rutile $TiO_2$," Advanced Materials 18:1421-1426 (Apr. 2006).
Hu et al., "Improved Electrode Performance of Porous $LiFePO_4$ Using $RuO_2$ as an Oxidic Nanoscale Interconnect," Advanced Materials 19:1963-1966 (Jul. 2007).

(56) References Cited

OTHER PUBLICATIONS

Huang et al., "Self-organizing high-density single-walled carbon nanotube arrays from surfactant suspensions," *Nanotechnology* 15:1450-1454 (Nov. 2004).
Huo et al., "Organization of Organic Molecules with Inorganic Molecular Species into Nanocomposite Biphase Arrays," *Chemistry Materials* 6:1176-1191 (Aug. 1994).
International Preliminary Report on Patentability and Written Opinion for PCT/US2009/004369 (mailed Feb. 10, 2011).
International Preliminary Report on Patentability and Written Opinion for PCT/US2010/045088 (mailed Feb. 23, 2012).
International Preliminary Report on Patentability and Written Opinion for PCT/US2010/045089 (mailed Feb. 23, 2012).
International Search Report and Written Opinion for PCT/US2011/047144 (mailed Feb. 23, 2012).
International Search Report and Written Opinion for PCT/US2011/055216 (mailed Apr. 23, 2012).
Jiang et al., "Nanocrystalline Rutile $TiO_2$ Electrode for High-Capacity and High-Rate Lithium Storage," *Electrochemical and Solid-State Letters* 10(5):A127-A129 (Mar. 2007).
Kavan et al., "Nanocrystalline $TiO_2$ (Anatase) Electrodes: Surface Morphology, Adsorption, and Electrochemical Properties," *Journal of the Electrochemical Society* 143(2):394-400 (Feb. 1996).
Kresge et al., "Ordered mesoporous molecular sieves synthesized by a liquid-crystal template mechanism," *Nature* 359:710-712 (Oct. 1992).
Leroux et al., "Electrochemical Lithium Intercalation into a Polyaniline/$V_2O_5$ Nanocomposite," *J. Electrochemical Society* 143(9):L181-L183 (Sep. 1996).
Li et al., "Processable aqueous dispersions of grapheme nanosheets," *Nature Nanotechnology* 3:101-105 (Jan. 2008).
Lindsay, "Data analysis and anode materials for lithium ion batteries," PhD Thesis, University of Wollongong Thesis Collection, Ch. 2, Section 2.5.5, http://ro.uow.edu.au/theses/359 (2004).
Liu et al., "Oriented Nanostructures for Energy Conversion and Storage," *ChemSusChem*, 1:676-697 (Aug. 2008).
Lou et al., "Template-Free Synthesis of $SnO_2$ Hollow Nanostructures with High Lithium Storage Capacity," *Advanced Materials* 18:2325-2329 (Aug. 2006).
Maier et al., "Nanoionics: ion transport and electrochemical storage in confined systems," *Nature Materials* 4:805-815 (Nov. 2005).
Mao et al., "Structural, electronic and magnetic properties of manganese doping in the upper layer of bilayer graphene," *Nanotechnology* 19(20):205708-205715 (May 2008).
McAllister et al., "Single Sheet Functionalized Graphene by Oxidation and Thermal Expansion of Graphite," *Chemical Materials* 19:4396-4404 (May 2007).
Mdleleni et al., "Sonochemical Synthesis of Nanostructured Molybdenum Sulfide," *Journal of the American Chemical Society* 12:6189-6190 (Jun. 1998).
Moriguchi et al., "A Mesoporous Nanocomposite of $TiO_2$ and Carbon Nanotubes as a High-Rate Li-Intercalation Electrode Material," *Advanced Materials* 18:69-73 (Jan. 2006).
Moskon et al., "Citrate-Derived Carbon Nanocoatings for Poorly Conducting Cathode," *Journal of the Electrochemical Society* 153(10):A1805-A1811 (Jul. 2006).
Nethravathi, et al., "Graphite Oxide-Intercalated Anionic Clay and Its Decomposition to Graphene-Inorganic Material Nanocomposites," *Langmuir* 24:8240-8244 (Aug. 2008).
Nishihara et al., "Carbon-coated mesoporous silica with hydrophobicity and electrical conductivity," *Carbon* 46(1):pp. 48-53 (Jan. 2008).
Niyogi et al., "Solution Properties of Graphite and Graphene," *Journal of the American Chemical Society* 128:7720-7721 (Jan. 2006).
Notice of Allowance from U.S. Patent and Trademark Office for U.S. Appl. No. 12/460,993, mailed Jul. 11, 2012.
Novoselov et al., "Electric Field Effect in Atomically Thin Carbon Films," *Science* 306:666-669 (Oct. 2004).
Office action from U.S. Patent and Trademark Office for U.S. Appl. No. 12/460,993, mailed Jan. 19, 2012.
Office action from U.S. Patent and Trademark Office for U.S. Appl. No. 12/462,857, mailed Jan. 10, 2012.
Office action from U.S. Patent and Trademark Office for U.S. Appl. No. 12/553,527, mailed Nov. 10, 2011.
Office action from U.S. Patent and Trademark Office for U.S. Appl. No. 12/553,527, mailed Jun. 1, 2012.
Office action from U.S. Patent and Trademark Office for U.S. Appl. No. 12/852,794, mailed Jan. 23, 2012.
Ou et al., "Characteristics of graphene-layer encapsulated nanoparticles fabricated using laser ablation method," *Diamond and Related Materials* 17(4-5):664-668 (Apr.-May 2008).
Paek et al., "Enhanced Cyclic Performance and Lithium Storage Capacity of $SnO_2$/Graphene Nanoporous Electrodes with Three-Dimensionally Delaminated Flexible Structure," *Nano Letters* 9(1):72-75 (Dec. 2008).
Peigney et al., "Specific surface area of carbon nanotubes and bundles of carbon nanotubes," *Carbon* 39:507-514 (Apr. 2001).
Prosini et al., "Improved electrochemical performance of a $LiFePO_4$-based composite cathode," *Electrochimica Acta* 46:3517-3523 (Aug. 2001).
Ramanathan et al., "Functionalized graphene sheets for polymer nanocomposites," *Nature Nanotechnology* 3:327-331 (May 2008).
Read et al., "$SnO_2$-carbon composites for lithium-ion battery anodes," *Journal of Power Sources* 96:277-281 (Jun. 2001).
Reddy et al., "Room temperature synthesis and Li insertion into nanocrystalline rutile $TiO_2$," *Electrochemistry Communications* 8:1299-1303 (Aug. 2006).
Restriction Requirement from the U.S. Patent and Trademark Office for U.S. Appl. No. 12/462,857, mailed Aug. 22, 2011.
Restriction Requirement from the U.S. Patent and Trademark Office for U.S. Appl. No. 12/553,527, mailed Sep. 26, 2011.
Richard et al., "Supramolecular Self-Assembly of Lipid Derivatives on Carbon Nanotubes," *Science* 300:775-778 (May 2003).
Sakamoto et al., "Hierarchical battery electrodes based on inverted opal structures," Journal of Materials Communication 12:2859-2861 (Aug. 2002).
Schniepp et al., "Functionalized Single Graphene Sheets Derived from Splitting Graphite Oxide," *The Journal of Physical Chemistry Letters* 110:8535-8539 (Apr. 2006).
Schniepp et al., "Self-Healing of Surfactant Surface Micelles on Millisecond Time Scales," *Journal of the American Chemical Society* 128:12378-12379 (Aug. 2006).
Si, et al., "Synthesis of Water Soluble Graphene," *Nano Letters* 8(6):1679-1682 (May 2008).
Srinivas, et al., "Molecular Dynamics Simulations of Surfactant Self-Organization at a Solid—Liquid Interface," *Journal of the American Chemical Society* 128(3):848-853 (Jan. 2006).
Stankovich et al., "Graphene-based composite materials," *Nature* 442:282-286 (Jul. 2006).
Stankovich et al., "Stable aqueous dispersions of graphitic nanoplatelets via the reduction of exfoliated graphite oxide in the presence of poly(sodium 4-styrenesulfonate)," *Journal of Materials Chemistry* 16:155-158 (document marked Nov. 2005).
Stoller et al., "Graphene-Based Ultracapacitors," *Nano Letters* 8(10):3498-3502 (Sep. 2008).
Superior Graphite Company, "Development of Low cost Carbonaceous Materials for Anodes in Lithium-Ion Batteries for Electric and Hybrid Electric Vehicles," DE-F02-00EE50630, 50 pages (Dec. 10, 2002).
Suslick et al., "Sonochemical synthesis of amorphous iron," *Nature* 353:414-416 (Oct. 1991).
Suzuki et al., "$H$-$T$ phase diagram and the nature of vortex-glass phase in a quasi-two-dimensional superconductor: Sn-metal layer sandwiched between graphene sheets," *Physica C: Superconductivity* 402(3):243-256 (Nov. 2003).
Tanaka et al., "Characteristics of graphene-layer encapsulated nanoparticles fabricated using laser ablation method," *Diamond and Related Materials* 17(4-5):664-668 (Nov. 2007).
Tarascon et al., "Issues and challenges facing rechargeable lithium batteries," *Nature* 414:359-367 (Nov. 2001).
Tung et al., "Low-temperature solution processing of graphene-carbon nanotube hybrid materials for high-performance transparent conductors," *Nano Lett.*, 9(5):1949-1955 (Apr. 2009).

(56) References Cited

OTHER PUBLICATIONS

U.S. Appl. No. 12/980,328, filed Dec. 28, 2010.
Wang, et al., "Atomic Layer Deposition of Metal Oxides on Pristine and Functionalized Graphene," *Journal of the American Chemical Society* 130:8152-8153 (Jun. 2008).
Wang, et al., "Cooperative Self-Assembly of Tertiary Systems: Novel Graphene-Metal Oxide Nanocomposites," Pacific Northwest National Laboratory and Princeton University 21 pages (date unknown).
Wang et al., "Low-Temperature Synthesis of Tunable Mesoporous Crystalline Transition Metal Oxides and Applications as Au Catalyst Supports," *Chemistry of Materials* 20:13499-13509 (Aug. 2008), J. Phys Chem C vol. 112 2008.
Wang et al., "Microemulsion Syntheses of Sn and $SnO_2$-Graphite Nanocomposite Anodes for Li-Ion Batteries," *Journal of the Electrochemical Society*, 151(4):A563-A570 (Feb. 20, 2004).
Wang et al., "Self-Assembled TiO-Graphene Hybrid Nanostructures for Enhanced Li-Ion Insertion," *ACS Nano*, 3(4):907-914 (Mar. 26, 2009).
Wang, et al., "Surface-Mediated Growth of Transparent, Oriented, and Well-Defined Nanocrystalline Anatase Titania Films," *Journal of the American Chemical Society* 128:13670-13671 (Oct. 2006).
Wang, et al., "Synthesis and Li-Ion Insertion Properties of Highly Crystalline Mesoporous Rutile $TiO_2$," *Chem. Mater.*, 20:3435-3442 (May 2008).
Wang et al., "Tin Nanoparticle Loaded Graphite Anodes for Li-Ion Battery Applications," *Journal of the Electrochemical Society*, vol. 151, No. 11, pp. A563-A570 (Oct. 4, 2004).
Watcharotone et al., "Graphene-Silica Composite Thin Films as Transparent Conductors," *Nano Letters* 7(7)1888-1892 (Jun. 2007).
Whitesides, et al., "Molecular Self-Assembly and Nanochemistry: A Chemical Strategy for the Synthesis of Nanostructures," *Science* 254:1312-1319 (Nov. 1991).
Williams, et al., "$TiO_2$-Graphene Nanocomposites. UV-Assisted Photocatalytic Reduction of Graphene Oxide," *Acs Nano* 2(7):1487-1491 (Jul. 2008).
Xu, et al., "Flexible Graphene Films via the Filtration of Water-Soluble Noncovalent Functionalized Graphene Sheets," Journal of the American Chemical Society 130:5856-5857 (Apr. 2008).
Yamabi, et al., "Crystal Phase Control for Titanium Dioxide Films by Direct Deposition in Aqueous Solutions," *Chemical Materials* 14:609-614 (Jan. 2002).
Yang, et al., "Generalized syntheses of large-pore mesoporous metal oxides with semicrystalline frameworks," *Nature* 396:152-155 (Nov. 1998).
Yao et al., "In situ chemical synthesis of SnO2-graphene nanocomposite as anode materials for lithium-ion batteries," *Electrochemistry Communications* 11:1849-1852 (Aug. 2009).
Yoo, et al., "Large Reversible Li Storage of Graphene Nanosheet Families for Use in Rechargeable Lithium Ion Batteries," *Nano Letters* 8(8):2277-2282 (Aug. 2008).
Yu et al., "Mesoporous tin oxides as lithium intercalation anode materials," *Journal of Power Sources* 104:97-100 (Jan. 2002).
Zhao et al., "Triblock Copolymer Syntheses of Mesoporous Silica with Periodic 50 to 300 Angstrom Pores," *Science* 279:548-552 (Jan. 1998).
Zhou et al., "Lithium Insertion into $TiO_2$ Nanotube Prepared by the Hydrothermal Process," *Journal of the Electrochemical Society* 150(9):A1246-A1249 (Jul. 2003).
Zukalová et al., "Pseudocapacitive Lithium Storage in $TiO_2(B)$," *Chemistry of Materials* 17:1248-1255 (Feb. 2005).
Bizdoaca et al., "Magnetically directed self-assembly of submicron spheres with a $Fe_3O_4$ nanoparticle shell," *Journal of Magnetism and Magnetic Materials*, 240(1-3):44-46 (Feb. 2002).
Final Office action from U.S. Patent and Trademark Office for U.S. Appl. No. 12/462,857, mailed Aug. 23, 2012.
Final Office action from U.S. Patent and Trademark Office for U.S. Appl. No. 12/553,527, mailed Nov. 20, 2012.
McDermott et al., "Electron Transfer Kinetics of Aquated $Fe^{+3/+2}$, $Eu^{+3/+2}$, and $V^{+3/+2}$ at Carbon Electrodes," *Journal of the Electrochemical Society*, 140(9):2593-2599 (Sep. 1993).
Mockensturm et al., "Van Der Waals' Elastica," *2005 ASME International Mechanical Engineering Congress and Exposition*, 277-291 (Nov. 5-11, 2005).
Notice of Allowance from U.S. Patent and Trademark Office for U.S. Appl. No. 12/901,526, mailed Apr. 15, 2013.
Office action from the Chinese Patent Office for Chinese Patent Application No. 200980129673.4, mailed Sep. 10, 2012.
Office action from the Chinese Patent Office for Chinese Patent Application No. 200980129673.4, mailed Mar. 7, 2013.
Office action from the Chinese Patent Office for Chinese Patent Application No. 200980135205.8, mailed Nov. 14, 2012.
Office action from U.S. Patent and Trademark Office for U.S. Appl. No. 12/901,526, mailed Dec. 3, 2012.
Office action from U.S. Patent and Trademark Office for U.S. Appl. No. 12/901,527, mailed Apr. 8, 2013.
Office action from U.S. Patent and Trademark Office for U.S. Appl. No. 12/980,328, mailed Feb. 27, 2013.
Office action from U.S. Patent and Trademark Office for U.S. Appl. No. 13/559,528, mailed Jan. 10, 2013.
Restriction Requirement from the U.S. Patent and Trademark Office for U.S. Appl. No. 12/901,527, mailed Dec. 13, 2012.
Ribeiro et al., "Assembly and Properties of Nanoparticles," *Nanostructure Science and Technology*, 33-79, see 62-63, 77 (2009).
Shao, "Influencing Surface Tension," *California State Science Fair 2006 Project Summary* Project No. J0531 http://www.usc.edu/CSSF/History/2006/Projects/J0531.pdf (Apr. 2006).
Slack, "Thermal Conductivity of Pure and Impure Silicon, Silicon Carbide, and Diamond," *Journal of Applied Physics*, 35(12):3460-3466 (Dec. 1964).
The Free Dictionary (Collins English Dictionary Entry) http://www.thefreedictionary.com/p/slurry (printed Apr. 15, 2015).
Walker, *Just the Facts 101 Textbook Key Facts*, Physics, vol. 1, Chapter 15 Fluids, p. 13 http://books.google.com/books?id=fhRX6IFg2fcC&pg=PT278lpg=PT278&dq=%22Surfactants+are+compounds+that+lower+the+surface+tension+of+a+liquid%22+-2012+-2011+-2010+-2009&source=bl&ots=cVS1AJ-GOS&sig=e9wgCJkhGYTe2zdqoq11y-iQG1o&hl=en&sa=X&ei=-6ErUO6NO6Wo0AGh74D4Bw&ved=OCEUQ6AEwBA#v=onepage&q=%22Surfactants%20are%20compounds%20that%20lower%20the%20surface%20tension%20of%20a%20liquid%22%20-20-2012%20-2011%20-2010%20-2009&f=false.
Xu et al., "Assembly of chemically modified graphene: methods and applications," *J. Mater. Chem.*, 21:3311-3323 (Mar. 2011).

* cited by examiner

FIG 1B
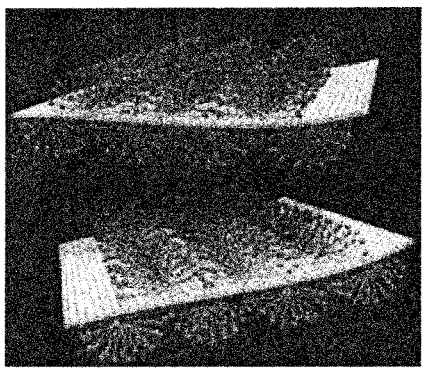
FIG 1C
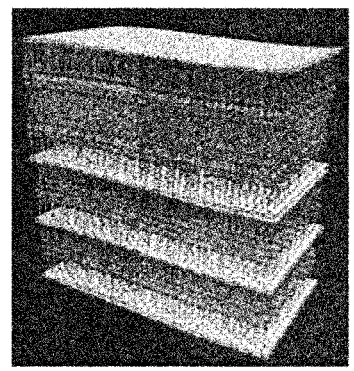
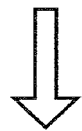
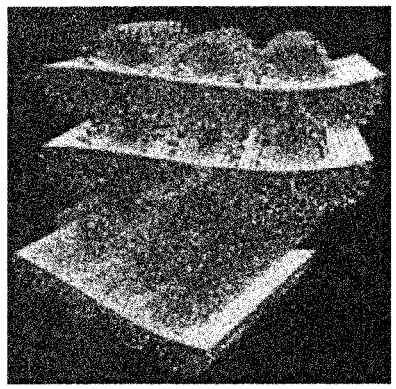
FIG 1E
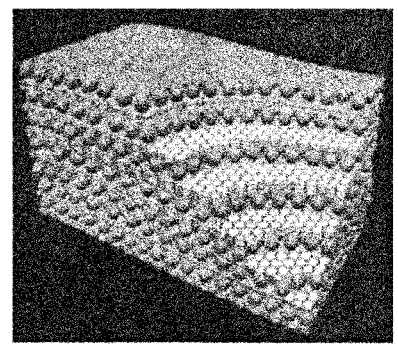
FIG 1D

SELF ASSEMBLED MULTI-LAYER NANOCOMPOSITE OF GRAPHENE AND METAL OXIDE MATERIALS

CROSS REFERENCE TO RELATED APPLICATION

This is a Divisional of U.S. patent application Ser. No. 12/462,857, filed Aug. 10, 2009, which is hereby incorporated by reference.

The invention was made with Government support under Contract DE-AC0676RLO 1830, awarded by the U.S. Department of Energy. The Government has certain rights in the invention.

TECHNICAL FIELD

This invention relates to nanocomposite materials of graphene bonded to metal oxides, devices using such materials, methods for forming nanocomposite materials of graphene bonded to metal oxides, and devices using those materials. More specifically, this invention relates to self-assembling multi-layer nanocomposite materials of graphene bonded to metal oxides, devices using such materials, methods for forming self-assembling multi-layer nanocomposite materials of graphene bonded to metal oxides and devices using those materials.

BACKGROUND OF THE INVENTION

Graphene is generally described as a one-atom-thick planar sheet of sp2-bonded carbon atoms that are densely packed in a honeycomb crystal lattice. The carbon-carbon bond length in graphene is approximately 0.142 nm. Graphene is the basic structural element of some carbon allotropes including graphite, carbon nanotubes and fullerenes. Graphene exhibits unique properties, such as very high strength and very high conductivity. Those having ordinary skill in the art recognize that many types of materials and devices may be improved if graphene is successfully incorporated into those materials and devices, thereby allowing them to take advantage of graphene's unique properties. Thus, those having ordinary skill in the art recognize the need for new methods of fabricating graphene and composite materials that incorporated graphene.

Graphene has been produced by a variety of techniques. For example, graphene is produced by the chemical reduction of graphene oxide, as shown in Gomez-Navarro, C.; Weitz, R. T.; Bittner, A. M.; Scolari, M.; Mews, A.; Burghard, M.; Kern, K. Electronic Transport Properties of Individual Chemically Reduced Graphene Oxide Sheets. and *Nano Lett.* 2007, 7, 3499-3503. Si, Y.; Samulski, E. T. Synthesis of Water Soluble Graphene. *Nano Lett.* 2008, 8, 1679-1682.

While the resultant product shown in the forgoing methods is generally described as graphene, it is clear from the specific capacity of these materials that complete reduction is not achieved, because the resultant materials do not approach the theoretical specific capacity of neat graphene. Accordingly, at least a portion of the graphene is not reduced, and the resultant material contains at least some graphene oxide. As used herein, the term "graphene" should be understood to encompass materials such as these, that contain both graphene and small amounts of graphene oxide.

For example, functionalized graphene sheets (FGSs) prepared through the thermal expansion of graphite oxide as shown in McAllister, M. J.; LiO, J. L.; Adamson, D. H.; Schniepp, H. C.; Abdala, A. A.; Liu, J.; Herrera-Alonso, M.; Milius, D. L.; CarO, R.; Prud'homme, R. K.; Aksay, I. A. Single Sheet Functionalized Graphene by Oxidation and Thermal Expansion of Graphite. *Chem. Mater.* 2007, 19, 4396-4404 and Schniepp, H. C.; Li, J. L.; McAllister, M. J.; Sai, H.; Herrera-Alonso, M.; Adamson, D. H.; Prud'homme, R. K.; Car, R.; Saville, D. A.; Aksay, I. A. Functionalized Single Graphene Sheets Derived from Splitting Graphite Oxide. *J. Phys. Chem. B* 2006, 110, 8535-8539 have been shown to have tunable C/O ratios ranging from 10 to 500. The term "graphene" as used herein should be understood to include both pure graphene and graphene with small amounts of graphene oxide, as is the case with these materials.

Further, while graphene is generally described as a one-atom-thick planar sheet densely packed in a honeycomb crystal lattice, these one-atom-thick planar sheets are typically produced as part of an amalgamation of materials, often including materials with defects in the crystal lattice. For example, pentagonal and heptagonal cells constitute defects. If an isolated pentagonal cell is present, then the plane warps into a cone shape. Likewise, an isolated heptagon causes the sheet to become saddle-shaped. When producing graphene by known methods, these and other defects are typically present.

The IUPAC compendium of technology states: "previously, descriptions such as graphite layers, carbon layers, or carbon sheets have been used for the term graphene . . . it is not correct to use for a single layer a term which includes the term graphite, which would imply a three-dimensional structure. The term graphene should be used only when the reactions, structural relations or other properties of individual layers are discussed". Accordingly, while it should be understood that while the terms "graphene" and "graphene layer" as used in the present invention refers only to materials that contain at least some individual layers of single layer sheets, the terms "graphene" and "graphene layer" as used herein should therefore be understood to also include materials where these single layer sheets are present as a part of materials that may additionally include graphite layers, carbon layers, and carbon sheets.

The unique electrical and mechanical properties of graphene have led to interest in its use in a variety of applications. For example, electrochemical energy storage has received great attention for potential applications in electric vehicles and renewable energy systems from intermittent wind and solar sources. One such energy storage application is Lithium ion (Li-ion) batteries.

Currently, Li-ion batteries are used in a variety of portable electronic devices. As a result of their excellent weight to power ratio, they are also being considered as the leading candidates for hybrid, plug-in hybrid and all electrical vehicles, and possibly for utility applications as well. However, many potential electrode materials (e.g., oxide materials) in Li-ion batteries are limited by slow Li-ion diffusion, poor electron transport in electrodes, and increased resistance at the interface of electrode/electrolyte at high charging-discharging rates.

For Li-ion batteries, $SnO_2$, Sn and Si are promising high capacity anode materials, but have large volume expansions upon lithiation, causing degradation and rapid fading during charge/discharge cycling. Efforts have been made to prepare composite materials to mix metal oxides and conductive materials such as amorphous carbon, carbon nanotubes and graphene, as discussed in Moriguchi, I.; Hidaka, R.; Yamada, H.; Kudo, T.; Murakami, H.; Nakashima, N. *Advanced Materials* 2006, 18, 69-73; Zhang, W. M.; Hu, J. S.; Guo, Y. G.; Zheng, S. F.; Zheng, L. S.; Song, W. G.; Wan, L. J. *Advanced*

*Materials* 2008, 20, 1160; and Huang, H.; Yin, S. C.; Nazar, L. F. *Electrochemical and Solid State Letters* 2001, 4, A170-A172.

Recently pre-synthesized metal oxide nanoparticles (e.g., $TiO_2$ and $SnO_2$) were deposited on graphene surfaces to form nanocomposites as described in Williams, G.; Seger, B.; Kamat, P. V. *ACS Nano* 2008, 2, 1487-1491; and Paek, S.-M.; Yoo, E.; Honma, I. *Nano Letters* 2009, 9, 72-75. Other studies, including Niyogi, S.; Bekyarova, E.; Itkis, M. E.; McWilliams, J. L.; Hamon, M. A.; Haddon, R. C. *Journal of the American Chemical Society* 2006, 128, 7720-7721; Si, Y.; Samulski, E. T. *Nano Letters* 2008, 8, 1679-1682, Stankovich, S.; Piner, R. D.; Chen, X. Q.; Wu, N. Q.; Nguyen, S. T.; Ruoff, R. S. *Journal of Materials Chemistry* 2006, 16, 155-158; and Xu, Y. X.; Bai, H.; Lu, G. W.; Li, C.; Shi, G. Q. *Journal of the American Chemical Society* 2008, 130, 5856, have shown that homogeneous dispersion of the conductive and the active phases remains difficult.

While these results were promising, they fell short of producing materials exhibiting specific capacity approaching the theoretical possibilities. For example, while it has been shown that graphene may be combined with certain metal oxides, the graphene materials in these studies fall far short of the theoretical maximum conductivity of single-sheet graphene. Further, those having ordinary skill in the art recognize that the carbon:oxygen ratio and the specific surface area of graphene provide an excellent proxy to measure the relative abundance of high conductivity single-sheets in a given sample. This is because the C:O ratio is a good measure of the degree of "surface functionalization" which affects conductivity, and the surface area conveys the percentage of single-sheet graphene in the synthesized powder.

Accordingly, those having ordinary skill in the art recognize that improvements to these methods are required to achieve the potential of using graphene nanostructures in these and other applications. Specifically, those skilled in the art recognize the need for new methods that produce nanocomposite materials of graphene and metal oxides that exhibit greater specific capacity and stability than demonstrated in these prior art methods. Further, those of ordinary skill in the art recognize a need for homogeneous dispersion of the conductive and the active phases, and methods for providing such materials.

The present invention fulfills these needs, and provides such improved composite nanostructures of graphene layers and metal oxides that exhibit specific capacities heretofore unknown in the prior art. The present invention further provides improved and novel methods for forming these composite nanostructures, and improved and novel devices that take advantage of the new and unique properties exhibited by these materials. The present invention meets these objectives by making nanostructures of graphene layers and metal oxides where the C:O ratio of the graphene layers in these nanostructures is between 15-500:1, and preferably 20-500:1, and the surface area of the graphene layers in these nanostructures is 400-2630 m2/g, and preferably 600-2630 m2/g, as measured by BET nitrogen adsorption at 77K. While those having ordinary skill in the art have recognized the desirability of having C:O ratios and surface areas this high in the graphene of nanostructures of graphene and metal oxides, the prior art methods have failed to produce them. The present invention further provides homogeneous dispersion of the conductive and the active phases.

SUMMARY OF THE INVENTION

These and other benefits are provided by one aspect of the present invention; a nanocomposite material having at least two layers, each layer consisting of one metal oxide bonded to at least one graphene layer. Typically, the nanocomposite material will have many alternating layers of metal oxides and graphene layers, assembled in a sandwich type construction. Preferably, but not meant to be limiting, the metal oxide used in the nanocomposite material of the present invention is $M_xO_y$, where M is selected as Ti, Sn, Ni, Mn, Si, V, and combinations thereof.

Also preferably, but not meant to be limiting, in the nanocomposite materials of the present invention at least one layer of the metal oxide is a mesoporous metal oxide. Also preferably, but not meant to be limiting, the nanocomposite material of the present invention is characterized by a specific capacity of greater than about 400 mAh/g.

Preferably, the graphene layers of the nanocomposite materials of the present invention have a thickness between 3 and 20 nm, and more preferably between about 0.5 and 50 nm. Also preferable, but not meant to be limiting, the graphene layers of the nanocomposite materials of the present invention have a carbon to oxygen ratio of between 15 to 1 and 500 to 1 and more preferably between about 20 to 1 and 500 to 1. Also preferably, but not meant to be limiting, the graphene layers of the nanocomposite materials of the present invention have a surface area of between 400 and 2630 m2/g and more preferably between about 600 and 2630 m2/g.

Another aspect of the present invention is a method for forming a nanocomposite material comprising at least two layers, each layer consisting of one metal oxide bonded to at least one graphene layer. This method involves the steps of providing graphene in a suspension; dispersing the graphene with a surfactant; adding a metal oxide precursor; precipitating the metal oxide and allowing the graphene and the metal oxide to organize into self assembled structures.

In this manner, the method of the present invention thereby forms a series of ordered layers, wherein each layer comprises a metal oxide bonded to at least one graphene layer. Those having ordinary skill in the art and the benefit of this disclosure will recognize that the steps of precipitating the metal oxide and allowing the graphene and the metal oxide to organize into self assembled structures may be performed simultaneously, or in either order. Further, those having ordinary skill in the art and the benefit of this disclosure will recognize that while the self assembly process will often result in the metal oxide portions of each successive layer being bound to the graphene portion of an adjacent layer, such is not necessarily the case. For example, and not meant to be limiting, it may be the case that a self assembled structure will form whereby the metal oxide portion of one layer will be bound to the metal oxide portion of a successive layer, or that metal oxide may form into a series of layers. All such self assembled structures should be understood to fall within the invention as described herein, provided that at least two of the layers in that structure comprise a metal oxide bonded to at least one graphene layer.

The suspension of the present invention may be water, or may contain water with other liquids. The method of the present invention may further include the step of precipitating the metal oxide wherein precipitating is maintained for about one to about 24 hours.

Preferably, but not meant to be limiting, the method of the present invention further includes the step of heating the final precipitate from 50 to 500 degrees C. to condense the metal oxide on the graphene surface. Also preferably, but not meant to be limiting, the method of the present invention may further include the step of heating the final precipitate from 50 to 500 degrees C. to remove the surfactant.

The present invention thus includes a nanocomposite material formed by the forgoing method. The nanocomposite material formed by this method is preferably formed into an ordered three-dimensional superstructure having multilength and multiphase building blocks of graphene layers and metal oxide layers, and at least two layers of the nanocomposite material include a metal oxide bonded to graphene. The nanocomposite materials preferably have a thickness between 3 and 20 nm.

While not meant to be limiting, the nanocomposite layers of the present invention find particular utility in energy storage applications. Accordingly, another aspect of the present invention is an energy storage device having a nanocomposite material including at least two layers, each layer having at least one metal oxide bonded to at least one graphene layer. In this application, it is preferred that the nanocomposite material have a specific capacity greater than about 400 mAh/g.

While not meant to be limiting, the nanocomposite layers of the present invention find particular utility as electrochemical devices. In this application, the nanocomposite layers of the present invention have at least one component formed in whole or in part of a nanocomposite material including at least one active metal compound and one graphene layer arranged in a nanoarchitecture. As will be recognized by those having ordinary skill in the art and the benefit of this disclosure, the component may selected as an electrode, an anode, a cathode, a separator, a current collector, an electrolyte, and combinations thereof.

Preferably, but not meant to be limiting, in the embodiment of the present invention where the nanocomposite material is used in the anode of an energy storage device, the anode contains less than 10% carbon-based material by weight, and more preferably less than 5% carbon-based material by weight.

Preferably, but not meant to be limiting, in the embodiment of the present invention where the nanocomposite material is used in the cathode of an energy storage device, the cathode contains less than 5% carbon-based material by weight, and more preferably less than 2.5% carbon-based material by weight.

One example of the present invention that is an electrochemical device and an energy storage device is a lithium ion battery. For example, and not meant to be limiting, one embodiment of the present invention is thus a lithium ion battery having an electrode, wherein the electrode has a nanocomposite material which has at least two layers, each layer including a metal oxide bonded to at least one graphene layer, and wherein said nanocomposite material has a specific capacity of greater than about 400 mAh/g, and wherein each layer includes a metal oxide bonded to graphene, and wherein the layers are provided as an ordered, three dimensional assembly.

As used herein, the term "electrochemical device" includes energy storage devices, energy conversion devices, sensors, and other devices that convert electrical energy to chemical energy, or chemical energy to electrical energy. As used herein, the term "energy storage device" includes batteries and supercapacitors.

BRIEF DESCRIPTION OF THE DRAWINGS

The following detailed description of the embodiments of the invention will be more readily understood when taken in conjunction with the following drawing, wherein.

The use of the surfactant sodium 1-dodecanesulfonate in dispersing FGSs in aqueous solution obtains similar results.

Figure 6A:
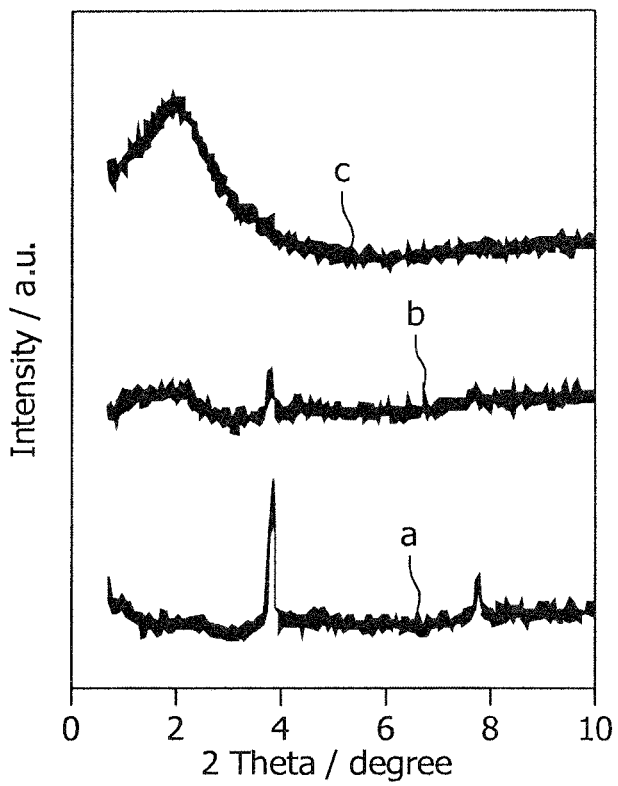

FIG. 6(A) is a low angle XRD pattern of the anionic surfactant-$SnO_2$-graphene precipitates after reaction time of 1 hr (a), 11 hr (b) and 16 hr (c). Lamellar mesophase with (001) d-spacing of 2.3 nm is observed in the mixture. FIG. 6 (B) is a cross-section TEM image of anionic surfactant-$SnO_2$-graphene precipitates after reaction time of 11 hr. Lamellar mesophase with layer distance of 2.4 nm is marked. FIG. 6 (C) is a TEM image showing worm-like structure of $SnO_2$ nanocrystals formed through reaction without graphene. FIG. 6 (D) is a cross-sectional TEM image of $SiO_2$-graphene nanocomposite powder (30 wt % $SiO_2$). Partially ordered mesoporous silica layers (4-5 mesoporous layer) are observed on the surface of graphene sheets following the contour of wrinked graphene sheets. FIG. 6 (E) is a high-resolution TEM image of the $SiO_2$-graphene nanocomposite powder in FIG. 6 (D). Graphene sheets are covered with hexagonal mesoporous silica.

FIG. 7 (A) is a side-view SEM image of a self-assembled free-standing $SnO_2$-graphene nanocomposite (40 wt % graphene) electrode 15-μm thick. Photographs in the inset show a disk-like 3-cm-diameter $SnO_2$-graphene nanocomposite paper electrode on the left and a bent paper electrode on the right. FIG. 7 (B) is a high-magnification cross-sectional SEM image of the free standing $SnO_2$-graphene nanocomposite electrode. The electrode is composed of well-packed wavy layers interspaced by the loosely packed layers through almost the entire cross section. FIG. 7 (C) is a schematic illustration of a Li-ion test configuration using a free-standing metal oxide-graphene nanocomposite electrode as an anode. The graphene in the layered superstructures functions as both current collector and conductive additives in the anode. FIG. 7 (D) is a graph showing the charge-discharge profiles of $SnO_2$-graphene nanocomposite paper electrode (40 wt % graphene) between 0 V and 1.5 V at current densities of 0.008 A/g, 0.02 A/g and 0.08 A/g, respectively. FIG. 7 (E) is a graph showing the specific capacity of $SnO_2$ as a function of charge-discharge cycles in the $SnO_2$-graphene nanocomposite paper electrode at current density of 0.01 A/g on top, and the specific capacity of $SnO_2$ as a function of charge-discharge cycles in the $SnO_2$-graphene nanocomposite paper at different charge/discharge current density of 0.008 A/g, 0.08 A/g and 0.02 A/g, respectively on the bottom. FIG. 7 (F) is a graph showing the cyclic voltammograms of $SiO_2$-graphene nanocomposite powder (30 wt % graphene) and FGSs measured in 1M $Na_2SO_4$ aqueous solution under a scan rate of 2 mV/s with saturated Ag/AgCl as reference electrode.

Figure 8A:
Figure 8B:
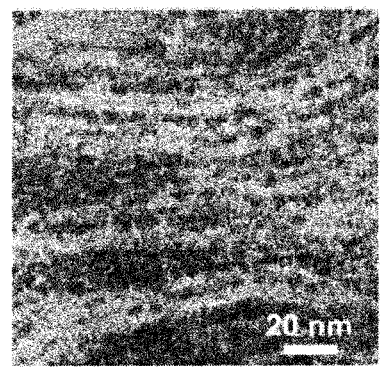
Figure 8C:
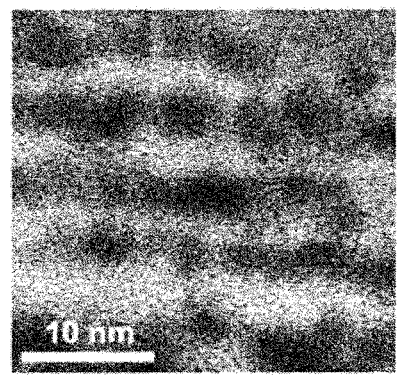

FIGS. 8 (a,b,c) are cross-sectional TEM images of the $SnO_2$-graphene nanocomposite paper. FIG. 8 (a) is a low-magnification TEM image, FIG. 8 (b) is a high-magnification TEM image showing the layered superstructure, and FIG. 8 (c) is a high-resolution TEM image showing alternating layers of nanocrystalline $SnO_2$ and graphene sheets.

Figure 9:
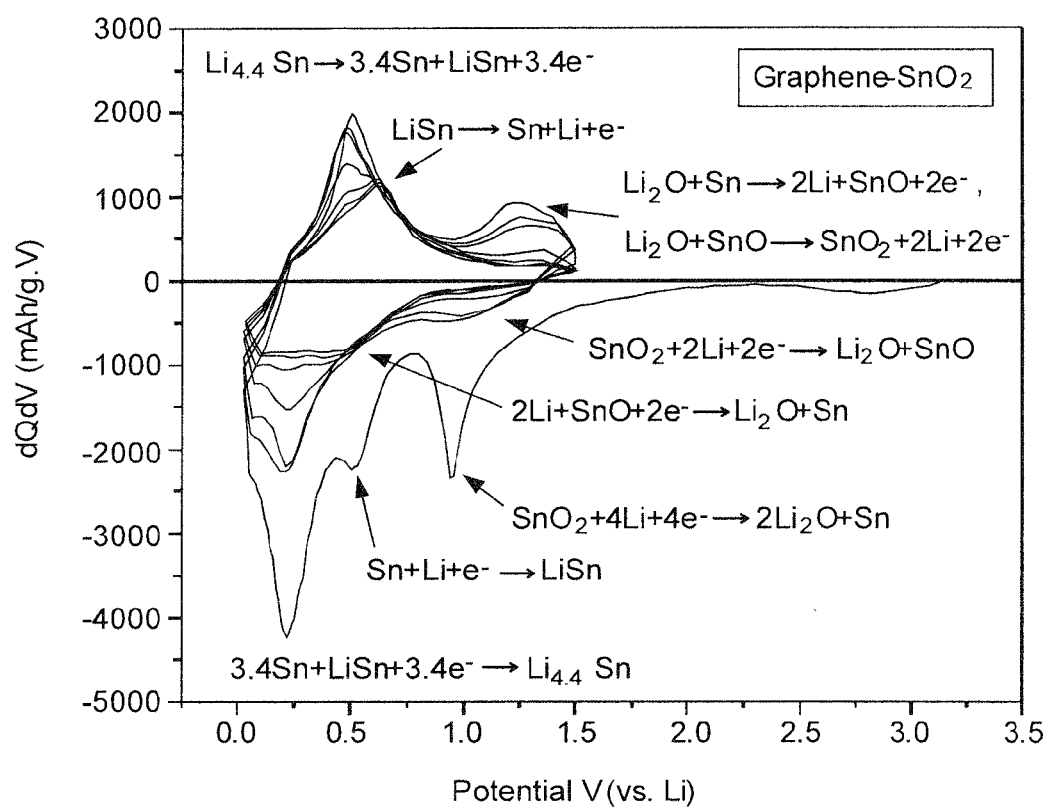

FIG. 9 is a graph showing dQ/dV vs. potential plot of lithiated/de-lithiated $SnO_2$-graphene nancomposites.

Figure 10:
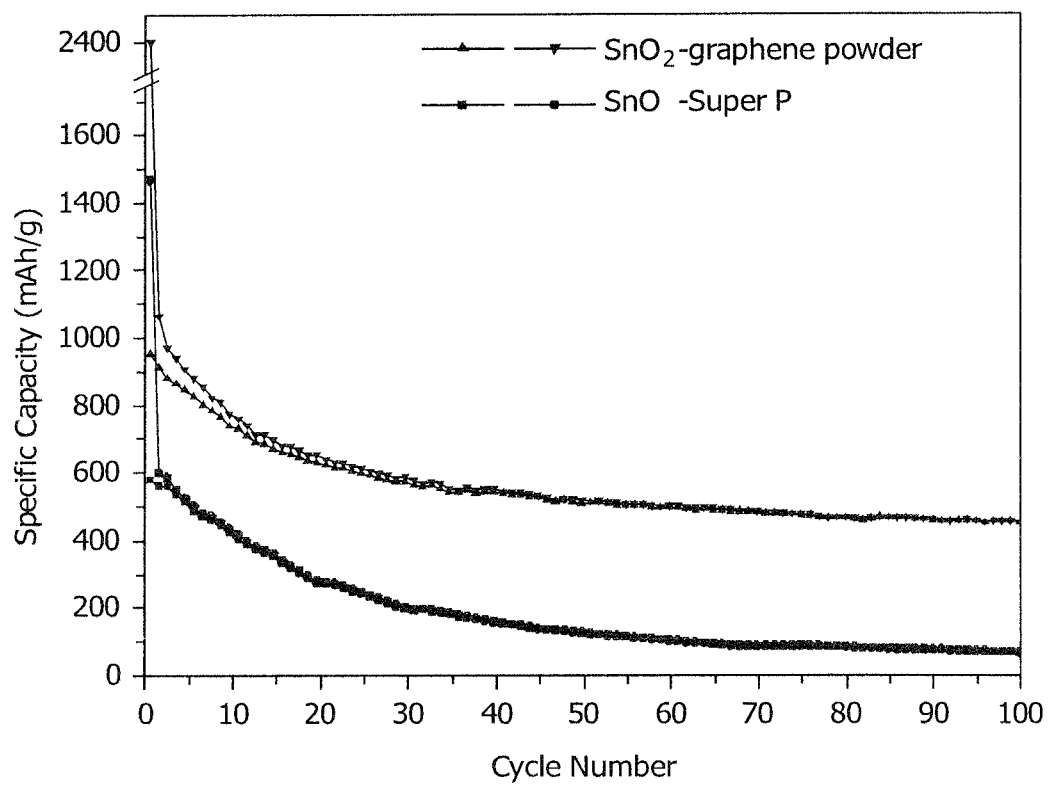

FIG. 10 is a graph showing the specific capacity of $SnO_2$ as a function of charge-discharge cycles in $SnO_2$-graphene nanocomposite powder (15 wt % graphene) and $SnO_2$-Super P (40 wt %) at current density of 0.2 A/g.

DETAILED DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

A series of experiments were conducted to demonstrate certain embodiments of the present invention. The experimental design is as follows.

Synthesis of $SnO_2$-Graphene Nanocomposites

In a typical preparation of $SnO_2$-graphene nanocomposite (e.g., 28 wt % graphene), 71.3 mg of graphene sheets and 12.2 mL of sodium 1-dodecanesulfonate aqueous solution (20 mg/mL, 60° C.) were mixed together. The mixture was diluted by de-ionized $H_2O$ to 30 mL and sonicated for 10-15 min (BRANSON SONIFER S-450A, 400W). 10 mL of 0.1 M $SnCl_2$ in 3.8 wt % HCl solution was added into as-prepared graphene-surfactant dispersions while stirring. Then, 4.8 mL of 1 M urea was added dropwise under vigorous stirring followed by addition of 4 mL of $H_2O_2$ solution (1 wt %). Finally, deionized $H_2O$ was added under vigorous stirring until reaching a total volume of 100 mL. For preparation of $SnO_2$-graphene nanocomposites (40 wt % graphene), 120 mg of graphene sheets and 16.3 mL of sodium 1-dodecanesulfonate aqueous solution were used following the same procedure. The resulting mixture was further stirred in a sealed polypropylene flask at 90° C. for 16 h.

Synthesis of NiO-Graphene Nanocomposites

In a typical preparation of NiO-graphene nanocomposite materials (e.g., 30 wt % graphene), 13 mg of graphene sheets and 1.5 mL of sodium dodecyl sulfate solution (0.5 M) were mixed together. The mixture was diluted by 20 mL of de-ionized $H_2O$ and sonicated for 10-15 min (BRANSON SONIFER S-450A, 400W). Then, 4.06 mL of 0.1 M $Ni(NO_3)_2$ solution was added dropwise under vigorous stirring followed by addition of 7.29 mL urea solution (0.1 g/L) and 30 mL of de-ionized $H_2O$. The resulting mixture was further stirred in a sealed polypropylene flask at 90° C. for 16 h. $SnO_2$-graphene and NiO-graphene nanocomposite precipitates were separated by centrifugation followed by washing with de-ionized $H_2O$ and ethanol. The centrifuge and washing processes were repeated three times. The obtained black powder of $SnO_2$-graphene and NiO-graphene nanocomposites were then dried in a vacuum oven at 70° C. overnight and subsequently calcined in static air at 400 C for 2 h and in 2.7% $H_2$/Ar gas at 400 C for 3 h, respectively.

Synthesis of $MnO_2$-Graphene Nanocomposites

In a typical preparation of $MnO_2$-graphene nanocomposite materials (e.g., 60 wt % graphene), 5 mg of graphene sheets and 2.5 mL of sodium dodecyl sulfate solution (0.5 M) were mixed together. The mixture was diluted by 20 mL of de-ionized $H_2O$ and sonicated for 10-15 min (BRANSON SONIFER S-450A, 400W). 6 mg of $KMnO_4$ was dissolved in 10 mL of 0.1 M $Na_2SO_4$ solution. Then the solution was added dropwise to the surfactant-graphene dispersion under vigorous stirring for 3 h. $MnO_2$-graphene nanocomposites were obtained by filtration followed by washing with de-ionized $H_2O$ three times. The nanocomposite sample was dried under vacuum overnight followed by heat treatment in atmosphere of 2.7% $H_2$/Ar gas at 400 C for 3 h.

Fabrication of Metal Oxide-Graphene Nanocomposite Paper Electrodes

Similar to processes of making graphene oxides and graphene papers, vacuum filtration of as synthesized $SnO_2$-graphene (40 wt % graphene), NiO-graphene (30 wt % graphene) and MnO$_2$-graphene (60 wt % graphene) nanocomposite solution using Anodisc membrane filters yielded, followed by washing and drying, a free standing metal oxide-graphene nanocomposite paper with thickness ranging from 5 to 20 μm. The metal oxide-graphene nanocomposite papers were then sandwiched between graphite plates and heat treated in an atmosphere of 2.7% H$_2$/Ar gas at 400 C for 3 h.

Synthesis of Mesoporous SiO$_2$-Graphene Nanocomposites 0.125 g of poly(ethylene glycol)-b-poly(propylene glycol)-b-poly(ethylene glycol) triblock copolymer (Pluronic P123, EO$_{20}$PO$_{70}$EO$_{20}$, Sigma-Aldrich, USA), 0.5 mL of tetraethyl orthosilicate (TEOS, Sigma-Aldrich), and 0.4 g of 0.1 M HCl were dissolved in 5 mL ethanol. The sol was stirred for 30 min. 0.01 g of graphene sheets was added into the sol followed by vigorous stirring for 15 min. The mixture was dropwise added to a membrane filter under vacuum. The obtained black powders were dried overnight followed by calcination in static air at 400° C. for 2 h. The weight percentage of SiO2 was estimated by TGA measurement.

Characterization

XRD patterns were obtained on a Philips Xpert X-ray diffractometer using Cu K$_\alpha$ radiation at λ=1.54 Å. The metal oxide-graphene nanocomposite samples were embedded in resin (LR White Resin, Electron Microscopy Sciences) followed by aging at 60° C. for 20 h. The embedded samples were cross-sectioned by ultramicrotome for TEM studies. The TEM investigation was performed on a JEOL JSM-2010 TEM operated at 200 kV. SEM images were obtained on an FEI Helios Nanolab dual-beam focused ion beam/scanning electron microscope (FIB/SEM) operated at 2 kV.

The Li-ion battery electrochemical evaluations were carried out using half-cell using 2325 coin cells (National Research Council, Canada). Li foil was used as counter and reference electrode. The heat treated SnO$_2$-graphene nanocomposite paper electrode (40 wt % graphene) was directly used as working electrode without additional electrode preparation. The electrolyte used was 1 M LIPF$_6$ in ethyl carbonate/dimethyl carbonate (volume ratio 1:1). For preparation of control electrodes using SnO$_2$-graphene nanocomposite powder (28 wt % graphene) and control SnO$_2$ powder, a mixture of the active materials, Super P and poly(vinylidene fluoride) (PVDF) binder were dispersed in N-methylpyrrolidone (NMP) solution in a weight ratio of 70:20:10 and 50:40:10, respectively. After stirring overnight the slurry was then coated on the copper foil current collector and dried overnight in air. The coil cells were assembled in an argon-filled glove box. The performance of the SnO$_2$-graphene nanocomposite paper electrode and the control electrodes were evaluated using Arbin Inst. (College Station, Tex.) at room temperature. The cells were tested between 0.02 V and 1.5 V versus Li metal at various current densities. The specific capacity was calculated based on SnO$_2$ weight.

The electrochemical capacitor performance of graphene sheets and mesoporous SiO$_2$ graphene nanocomposites were analyzed with CHI 660c electrochemical workstation (CHI Instruments Inc, Austin, Tex.). All experiments were carried out with a conventional three-electrode configuration in a beaker-type cell. To prepare the working electrode, 5 mg of graphene sheets and mesoporous silica/graphene nanocomposite powder was dispersed in 1 mL of dimethyl formamide or 1 mL of H$_2$O, respectively. The mixture was sonicated for 5 min. 5 μL of the solution was deposited on glassy carbon electrode and dried in air. 5 μL of a 5% Nafion solution was dropped on the top of the electrode to prevent the loss of the composite material. A platinum wire and an Ag/AgCl electrode were used as the counter and reference electrodes, respectively. The electrolyte was 1M Na$_2$SO$_4$ aqueous solution. The specific capacitance was calculated from cyclic voltammograms according to C=I/(m×scan rate), where I represents average current in either positive or negative scan, and m is the mass of single electrode. The real capacitor would operate with a capacitance one-fourth that of the single electrode due to the series connection of two electrodes in real capacitors.

In these experiments, a multiphase self-assembly approach is used to form well-controlled, three-dimensional nanocomposite materials for energy storage from extended nanostructured building blocks. Two-dimensional graphene layers, or sheets, were used as the macromolecular template for the absorption and cooperative assembly of surfactant micelles and metal oxide precursors. As shown in these experiments, the surfactant, metal oxide, and graphene sheets self-assemble into ordered three-dimensional superstructures. The use of these nanocomposite materials for advanced energy storage was then demonstrated. In Li-ion batteries, SnO$_2$-graphene nanocomposites of the present invention achieved near theoretical specific energy density without significant charge-discharge degradation for Li-ion battery applications. Mesoporous SiO$_2$-graphene nanocomposites of the present invention showed high specific capacitance for electrical double layer supercapacitors.

In contrast to synthetic approaches, nature has the ability to form nanocomposites with well-controlled architecture from multiscale and multifunctional building blocks. For example, mollusk shells grow distinctive nacreous laminated composites with aragonite nanoplates and organic films between the plates. Coccolith and magnetosom assemble highly organized hierarchical structures from nano- and microcrystalline building blocks. Although in synthetic materials both two-dimensional and three-dimensional molecular templates have been investigated to prepare oriented ceramic thin films, single phase mesostructured inorganics, polymers/surfactants and nanoparticle nanocomposites, self-assembly from multilength and multiphase building blocks has not been successfully demonstrated.

Figure 1A:
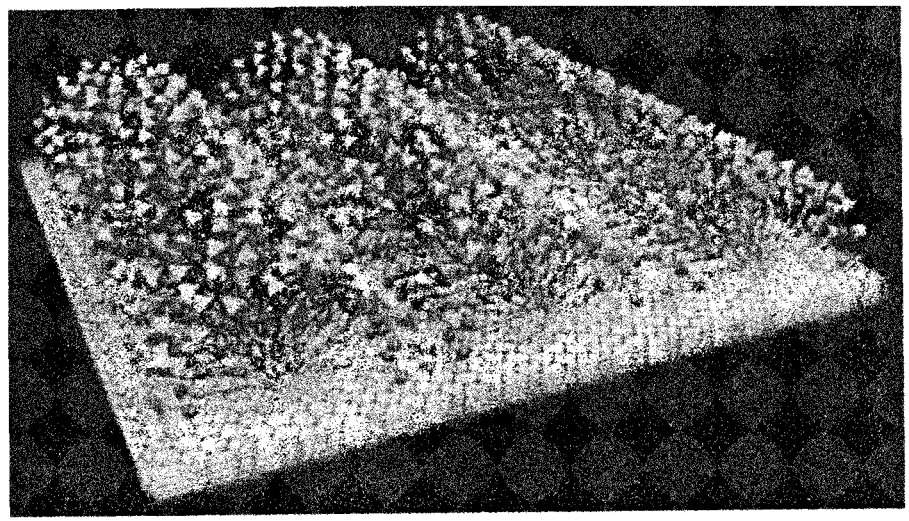
FIG. 1 is a schematic illustration of the multiphase self-assembly approach of the present invention. 1(A) shows self-assembled hemimicelles on graphite surfaces. 1(B) shows absorption of surfactant hemimicelles on graphene sheets and dispersed macromolecular graphene sheets and surfactant micelles in an aqueous solution. The dispersed graphene sheets can be used as the macromolecular template and the nanophase building block for self-assembly of three-dimensional nanocomposites. 1(C) shows self-assembly of anionic SDS surfactant on graphene surface with oppositely charged metal cation (e.g., $Sn^{2+}$) oxy species into lamella mesophase superstructures toward formation of $SnO_2$-graphene nanocomposites, where hydrophobic graphene sheets are sandwiched in the hydrophobic domains of the anionic surfactant. 1(D) shows metal oxide-graphene layered superstructures composed of alternating layers of metal oxide nanocrytals and graphene layers after crystallization of metal oxide and removal of the surfactant. 1(E) shows self-assembled hexagonal mesostructure of metal oxide precursor (e.g., silicate) with non-ionic surfactants (e.g., Pluronic P123) with graphene sheets.
Figure 2A:
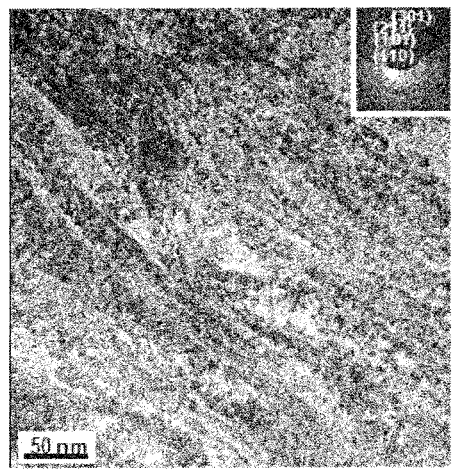
FIG. 2(A) to (E) are TEM images of calcined $SnO_2$-graphene (15 wt % graphene) nanocomposite powder. 2(F) to (H) are TEM images of the NiO-graphene nanocomposite powder. 2(A) is a bright-field cross-sectional TEM image of the $SnO_2$-graphene nanocomposite powder showing layered structures. The inset is the corresponding SAED pattern. The ring pattern of diffraction shows polycrystalline cassiterite $SnO_2$. The right symmetrical diffraction spots located at (110) ring corresponds to (001) diffraction of oriented multilayer graphene sheets. 2(B) is a dark-field TEM image obtained from (211) diffraction ring of $SnO_2$. 2(C) is a dark-field TEM image obtained from the bright (001) diffraction spots of graphene sheets. 2(D) is a high-magnification TEM of $SnO_2$-graphene nanocomposites in 2(A). The layered structure of $SnO_2$ is composed of connected nanocrystalline $SnO_2$ with a 4-5 nm diameter interspaced by graphene layers. 2(E) is a high-resolution TEM image of the layered superstructure of $SnO_2$-graphene nanocomposites in 2(D). Lattice fringes of 0.33 nm corresponding to (110) plane of $SnO_2$ and lattice fringes of 0.34 nm corresponding to (001) of multilayer graphene sheets are marked in each layer. 2(F) is a bright-field cross-sectional TEM image of the NiO-graphene nanocomposite (40 wt % graphene) showing nanocrystalline NiO layers (approximately layer thickness of 4 nm) interspaced by graphene layers. The inset is the corresponding SAED pattern showing polycrystalline NiO. 2(G) is a high resolution TEM image of NiO-graphene nanocomposite showing the graphene sheets between NiO layers. Lattice fringes of 0.33 nm corresponding to (001) of multilayer graphene sheets are marked. (H) High resolution TEM image of NiO-graphene nanocomposite showing the lattice fringes of NiO along direction. Lattice fringes of 0.24 nm corresponding to (111) planes in NiO are marked.
Figure 2B:
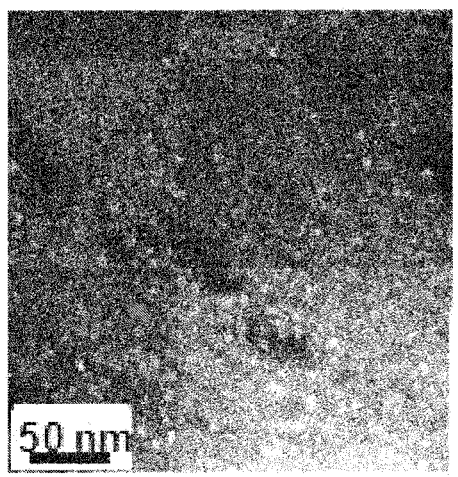
Figure 2C:
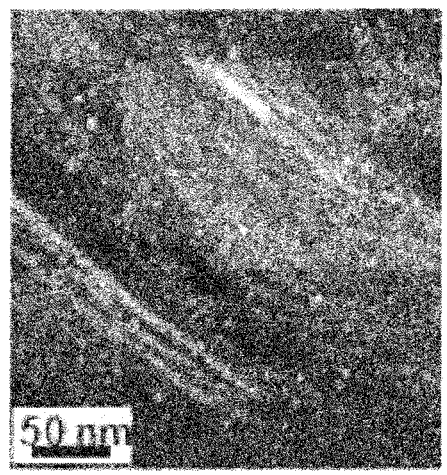
Figure 2D:
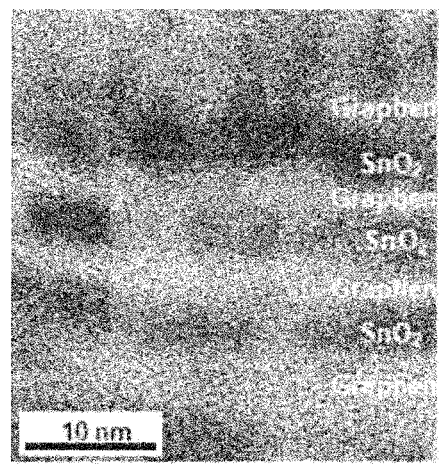
Figure 2E:
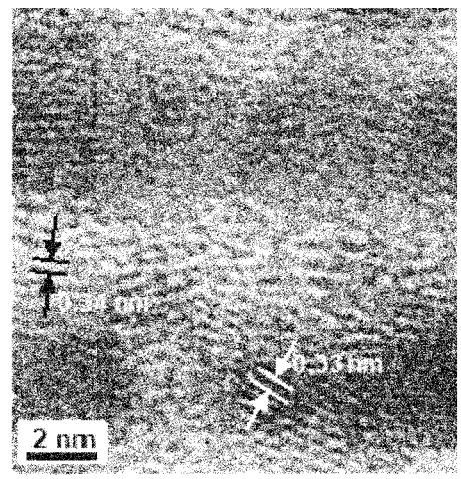
Figure 2F:
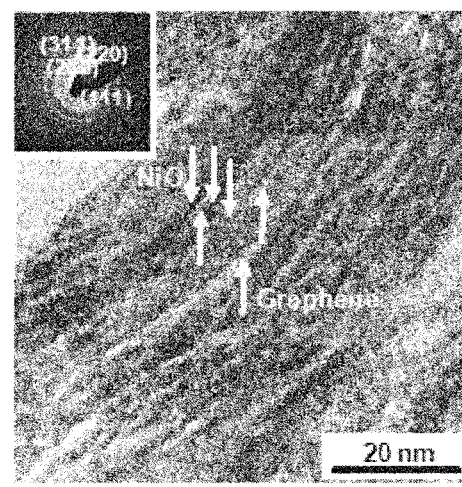
Figure 2G:
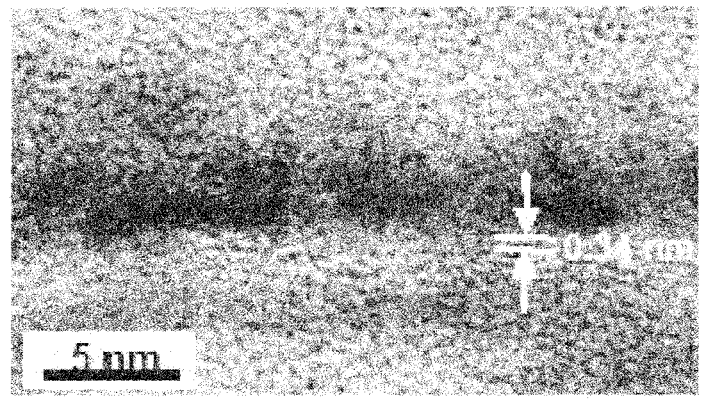
Figure 2H:
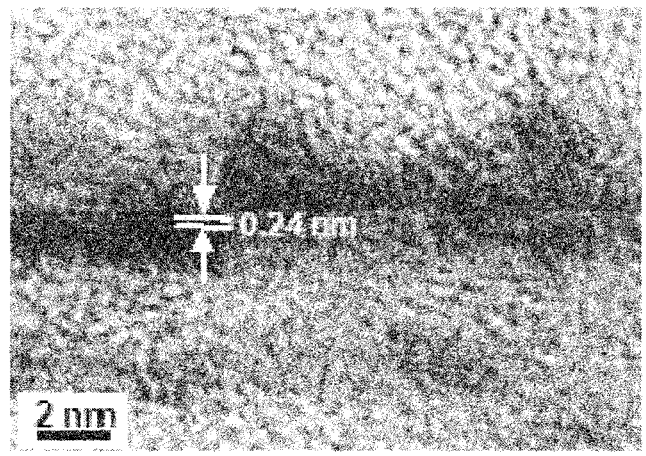

In these experiments, a multiphase self-assembly strategy using both traditional molecular precursors and extended two-dimensional nanosheets as the fundamental building blocks was demonstrated. The formation of complex, self-assembled mesostructures supported on graphite and other substrates has previously been shown. These studies provide some clue for the strategy used to construct three-dimensional, bulk materials. The basic concept is that instead of a graphite substrate, these experiments use two-dimensional nanosheets (graphene) as the macromolecular template for the cooperative absorption and assembly of surfactants and metal oxides on the graphene surface. At the same time, the extended graphene sheets participate in the self-assembly of the surfactant and metal oxide to form ordered three-dimensional superstructures, thus becoming a critical functional component of the nanocomposite materials, as shown in FIG. 1.

Graphene is chosen as a model material because of the high electronic conductivity and good mechanical properties. These experiments used functionalized graphene sheets (FGSs) prepared by thermal expansion process of exfoliated graphene oxide. The surfactant first absorbs to the graphene surfaces as hemimicelles to ensure that the graphene nanosheets are dispersed in the hydrophobic domains of the surfactant micelles. The anionic surfactant simultaneously binds to positively charged metal anions and self-assembles with the graphene to form an ordered lamella mesophase. Subsequently, the metal oxides are crystallized between the graphene, producing a new class of nanocomposites in which alternating layers of graphene sheets and metal oxide nanocrystals are assembled into a layered superstructures.

These experiments focus on the nanocomposites made of metal oxides (e.g., $SnO_2$, NiO, and $MnO_2$ etc) that are good candidates for electrochemical energy storage. However, as will be recognized by those having ordinary skill in the art and the benefit of this disclosure, other metal oxides could also be used. One challenge that these experiments overcome is the low conductivity of such materials, which usually requires the addition of a conductive phase to enhance their electron and ion transport. Another challenge that these experiments overcome is the instability of these anode materials upon lithiation (alloying).

For example, when used in Li-ion batteries, $SnO_2$ is a promising high capacity anode material, but has a large volume expansion upon lithiation, causing degradation and rapid fading during charge/discharge cycles.

FIG. 2 shows the Transmission electron microscopy (TEM) results of the superstructures of alternating nanometer-thick layers of nanocrystalline metal oxides and graphene sheets in $SnO_2$-graphene and NiO-graphene nanocomposites prepared in the powder form. Cross-sectional TEM image of the calcined $SnO_2$-graphene nanocomposite prepared clearly shows the regular layers, as shown in FIG. 2A. Each layer is about 3 to 5 nm thick and is rather uniform. A selected area electron diffraction (SAED, inset in FIG. 2A) pattern suggests a typical crystal structure of cassiterite $SnO_2$ (JCPDS No. 000-0024), which is consistent with the X-ray diffraction (XRD) result shown in FIG. 3. The corresponding dark-field image from the (211) reflection of $SnO_2$ shown in FIG. 2(b) confirms that the $SnO_2$ layer is made up of 4-nm nanocrystals. Two symmetrical but diffuse diffraction spots are also observed on top of the (110) diffraction ring of the $SnO_2$, which are attributed to the (001) reflection of the oriented multilayer graphene sheets. The dark-field image shown in FIG. 2(c) from the (001) reflection of the graphene sheets indeed reveals band structures of the multilayer graphene sheets separated by $SnO_2$. A high-magnification TEM image shown in FIG. 2(d) reveals that the $SnO_2$ nanoparticles are connected to one another within the layer but separated from layer to layer by graphene sheets. Lattice fringes of both the (110) plane in 4-nm-diameter nanocrystalline $SnO_2$ and the (001) plane in multilayer graphene sheets are observed in high-resolution TEM image as shown in FIG. 2(e). Similarly, layered superstructures with alternating layers of metal oxide and graphene sheets are also observed in NiO-graphene, as shown in FIG. 2(f) and $MnO_2$-graphene nanocomposites as shown in FIG. 4. Lattice fringes of the (001) plane in multilayer graphene sheets and the (111) plane in 5-nm thick nanocrystalline NiO layer are observed in high-resolution TEM images as shown in FIGS. 2(g) and 2(h).

Figure 5A:
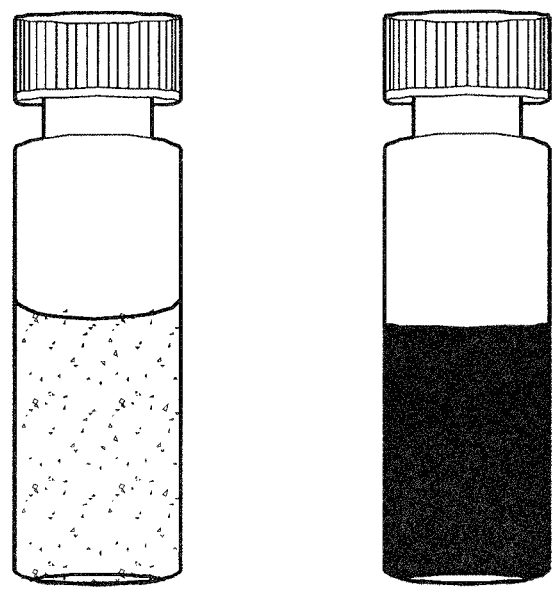
FIG. 5(a) is a photograph of a FGS aqueous dispersion (left) and FGS aqueous dispersion using sodium dodecyl sulfate (SDS) surfactant (right)
Figure 5B:
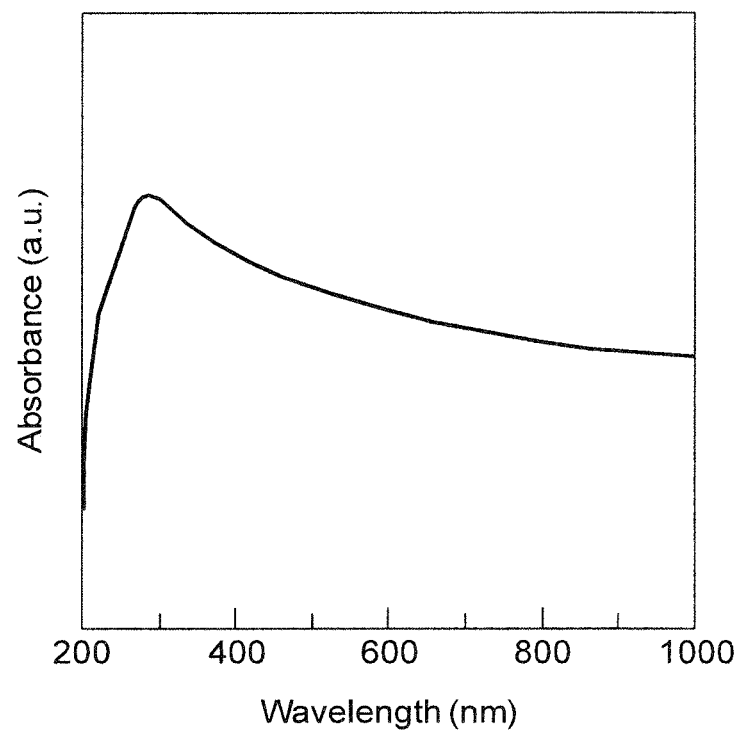
FIG. 5(b) is a graph showing the UV-Vis absorbance of the SDS-FGS aqueous dispersion.

The unique superstructure in the nanocomposites is a direct result of the cooperative self-assembly involving the surfactant, the metal oxide, and nanophase building blocks of graphene sheets. Both experimental and theoretical studies suggested that anionic surfactant molecules absorbed on a graphite surface form tubular, hemicylindrical micelle aggregates. Thus, the anionic surfactant can disperse the FGSs in the hydrophobic domains of the surfactant micelles to form a well-dispersed FGS solution, as shown in FIG. 5. However, when the metal oxide precursor (e.g., $SnO_2$ precursor) is added to the solution, a black precipitate was obtained with a lamellar mesostructure as revealed by the XRD pattern, as shown in FIG. 6(a). Such a transition from rod-like micelles to lamella structures is caused by the binding of the metal cations with the anionic surfactant head groups which reduces the net charge and the effective head group size, favoring formation of the lamellar mesophase. In addition, the graphene surface might have provided a substrate effect that promotes and stabilizes the lamellar mesophase. Examples of this effect include lamellar mesostructured film on a substrate using SDS as a structural directing agent by evaporation-induced self-assembly or electrochemical deposition.

Figure 6B:
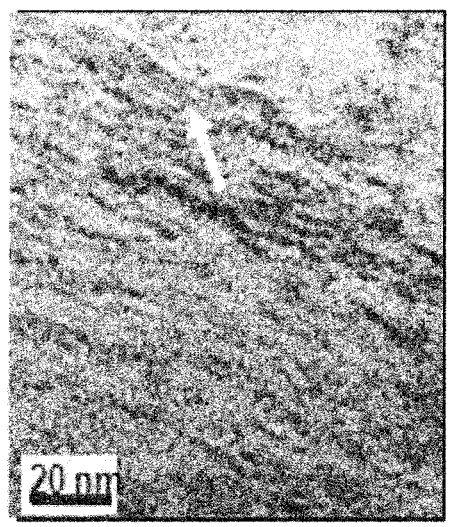
Figure 6C:
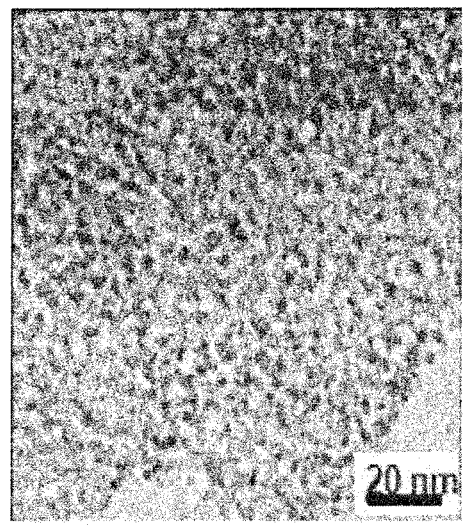

After formation of the lamellar mesophase, the hydrophobic graphene should still be located in the hydrophobic domain of the lamellar mesophase. Further reaction causes crystallization of $SnO_2$ between the graphene sheets and leads to degradation of the long-range ordering of the lamellar mesophase as shown in FIG. 6(a), but the overall lamellar mesostructures can be still observed in the TEM image as shown in FIG. 6(b) with an adjacent layer distance of 2.4 nm, consistent with the (001) d-spacing (2.3 nm) observed in the XRD pattern. Finally, calcination results in the decomposition and removal of the surfactants and further growth of $SnO_2$ nanocrystals forming an interconnected nanocrystalline $SnO_2$ layer between the graphene sheets. As a comparison, only worm-like nanoporous structures are produced in absence of graphene as shown in FIG. 6(c).

Several layers of graphene sheets are observed between nanocrystalline metal oxide layers. Such multilayers are most likely caused by restacking of graphene due to van der Waals force during reaction, which is a common phenomenon even in the presence of the anionic sulfate surfactant. It is also possible that some of the restacked graphene sheets in the $SnO_2$-graphene nanocomposites come directly from FGS samples that have not been fully exfoliated. Thus, while the inventors are not certain of the exact mechanism that holds the metal oxide to the graphene layer, it is reasonably suspected to be Van Der Waals forces. However, the invention should not be considered as limited to such arrangements. Accordingly, as used herein the term "bonded" should be understood to include any forces that effectively hold the two materials adjacent to one and another.

Figure 6D:
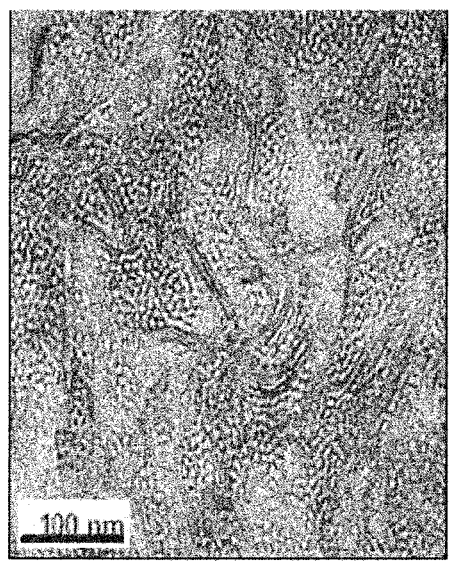
Figure 6E:
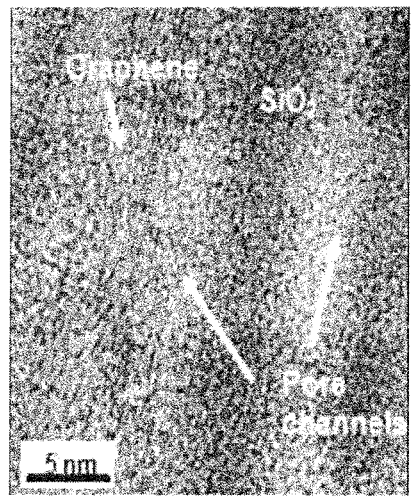

An example of nanocomposites made of graphene and hexagonal mesoporous silica is shown in FIGS. 6(d) and 6(e). In this example, a block co-polymer, i.e., Pluronic P123, is used to assist self-assembly of silica on a graphene surface. The nonionic surfactant can adsorb to the graphene surfaces into hemimicelles. However with this surfactant and silica the hexagonal mesophase is more favorable, resulting in a three-dimensional interconnected network of mesoporus silica and graphene sheets.

Figure 7A:
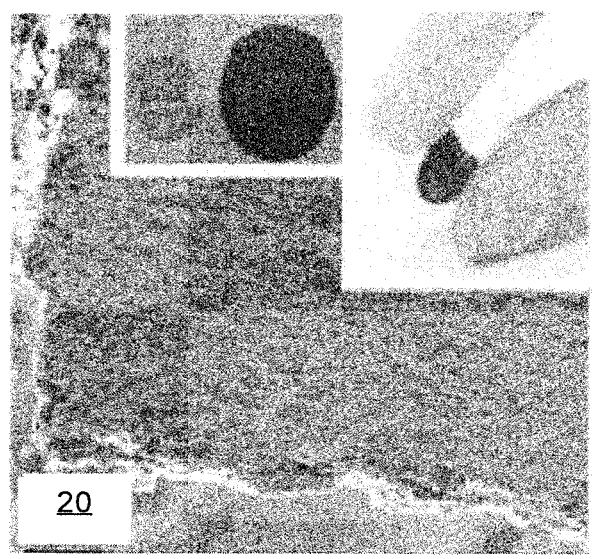
Figure 7B:
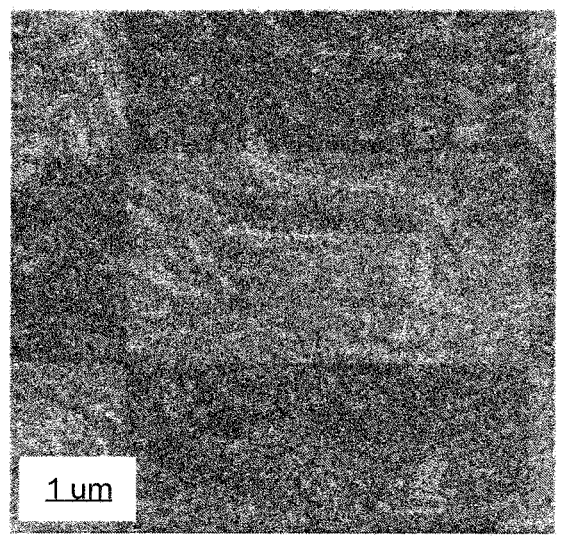

These experiments then investigated the charge-discharge properties of $SnO_2$-graphene nanocomposite as the anode for Li-ion batteries. Instead of using the as-prepared powders, the experiments assembled free-standing flexible electrodes in one step without using a binder or current collector. This approach has the potential to directly fabricate energy storage devices through self-assembly. A SEM image of the free-standing $SnO_2$-graphene nanocomposite electrode, about 15-μm thick, is shown in FIG. 7(a). The $SnO_2$-graphene nanocomposite electrode in the form of a disk with a diameter of 30 mm is robust and fairly flexible, as shown in the inset of FIG. 7(a). A polished cross-sectional SEM image shown in FIG. 7(b) reveals typical parallel, wavy layer architectures. A cross-sectional TEM image of the $SnO_2$-graphene electrode shown in FIG. 8 shows similar layered superstructures with alternating layers of nanocrystalline $SnO_2$ and graphene sheets, as for that in powders, as shown in FIG. 2(a)-FIG. 2(e).

Figure 7C:
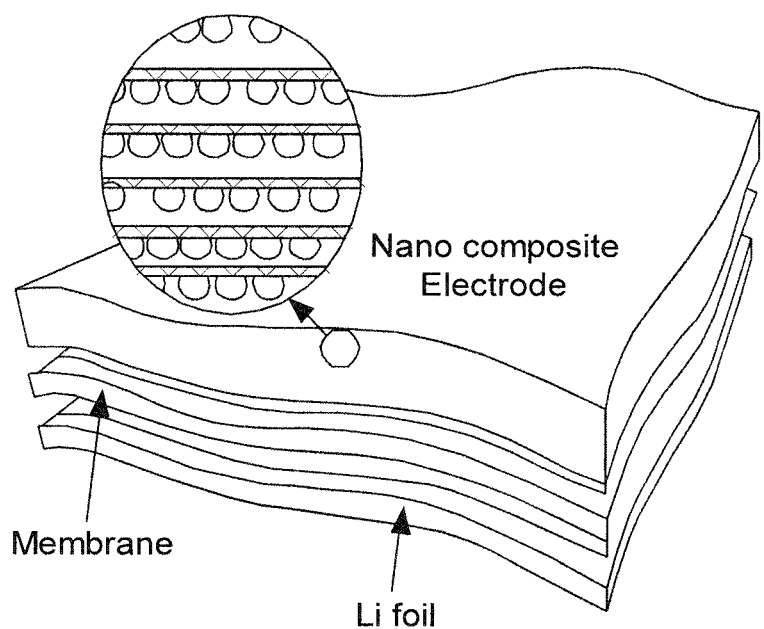
Figure 7D:
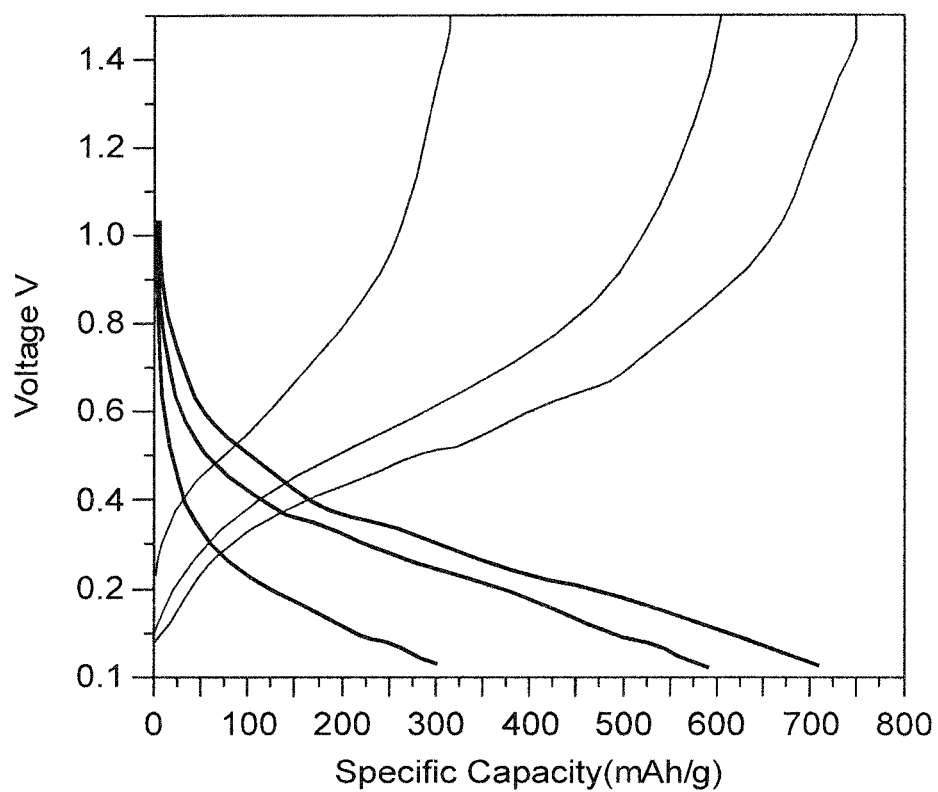

The free standing $SnO_2$-graphene nanocomposite electrodes were further studied using a half cell design. The coin cell contains a Li metal foil and a separator film of Celgard 2400 saturated with 1M $LiPF_6$ in ethylene carbonate and dimethyl carbonate (1:1 by volume), as shown in FIG. 7(c). The voltage-capacity profiles of the $SnO_2$-graphene nanocomposite electrode at different current density are shown in FIG. 7(d). $SnO_2$ is converted into metallic Sn in the first charge/discharge cycle, as confirmed from differential charge/discharge curves of $SnO_2$-graphene nanocomposite electrode. In the subsequent charge/discharge cycles, Li ions were reversibly inserted into Sn as Li/Sn alloys (LiSn or $Li_{4.4}Sn$) as shown in FIG. 9. Pure graphene tested within the same voltage range at current density of 0.004 A/g has a steady capacity of 120 mAh/g. At 40 wt % graphene in the nanocomposites, the capacity from graphene is less than 10% of the total capacity in the $SnO_2$-graphene electrode. The overall capacity of the electrode is mostly from the $SnO_2$ active phase.

Figure 7E:
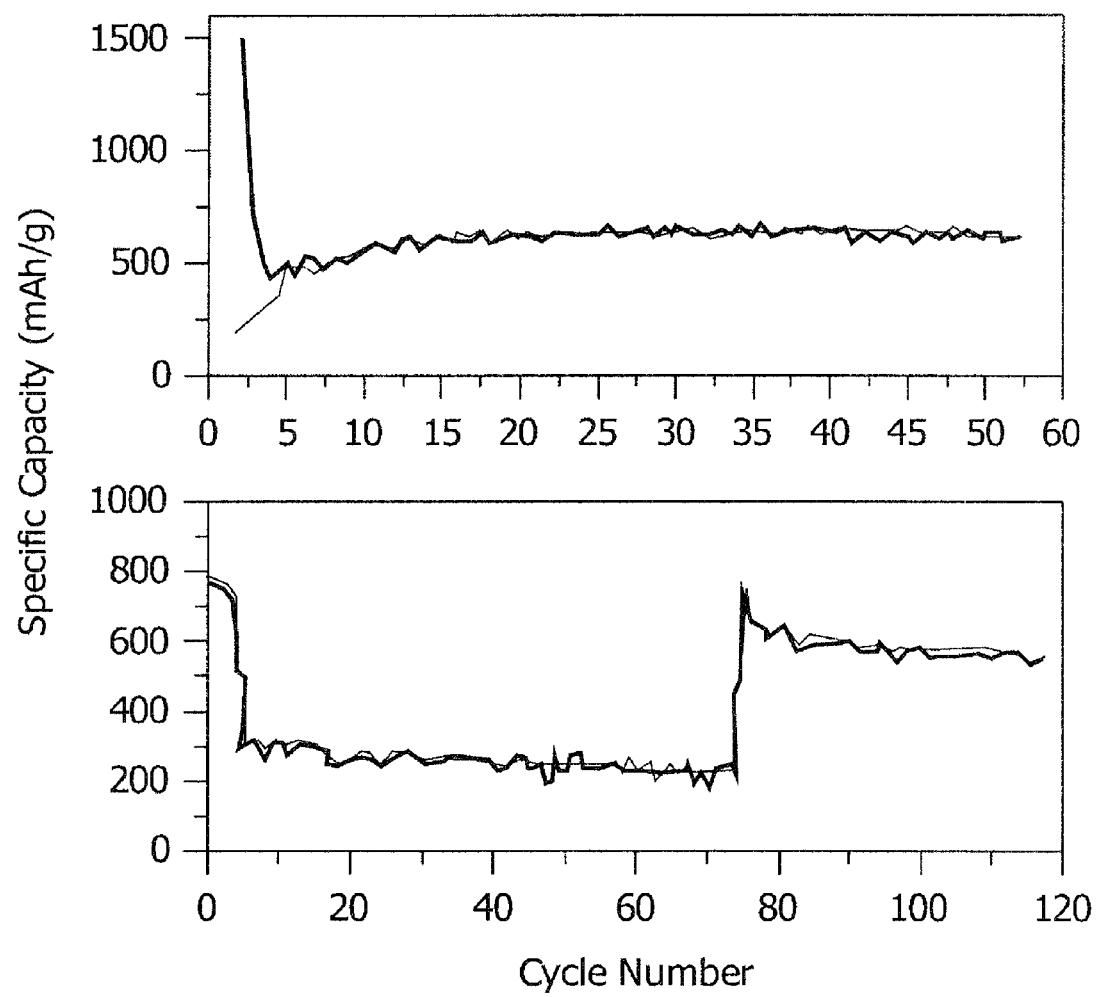

The specific capacity of the $SnO_2$ in the nanocomposite paper as a function of cycle number is shown in FIG. 7(e). The discharge capacity drop in $1^{st}$ cycle is attributed to irreversible conversion of $SnO_2$ to Sn and $Li_2O$ upon lithiation. The increase in specific capacity during the initial 10 cycles is attributed to improvement in electrolyte wetting of dense $SnO_2$-graphene nanocomposite electrode and the conversion of $SnO_2$ to Sn occurring upon initial lithiation. As the electrode is well wetted by the electrolyte, a steady specific capacity of 625 mAh/g is obtained at a current density of 0.02 A/g (as shown in FIG. 7(e), top). Significantly, the $SnO_2$-graphene nanocomposite electrode shows excellent capacity retention over the charge-discharge cycles in contrast to the rapid degradation of the control $SnO_2$-Super P electrode, $SnO_2$-graphene powder electrode as shown in FIG. 10, and typical $SnO_2$ electrode materials. A steady specific capacity of 760 mAh/g for the nanocomposite paper can be obtained at a current density of 0.008 A/g (shown in FIG. 7(e), bottom), close to the theoretical capacity (780 mAh/g). The specific capacities of 225 mAh/g and 550 mAh/g are obtained at a current density of 0.08 A/g and 0.02 A/g (shown in FIG. 7(e), bottom), respectively. At all the charge rates, the specific capacity in nanocomposite papers is well retained during cycling at different rates. The higher capacity and better stability in the nanocomposite electrodes are attributed to good contact between the nanocrystalline $SnO_2$ and sandwiched graphene even after conversion and volume change upon lithiation.

Figure 7F:
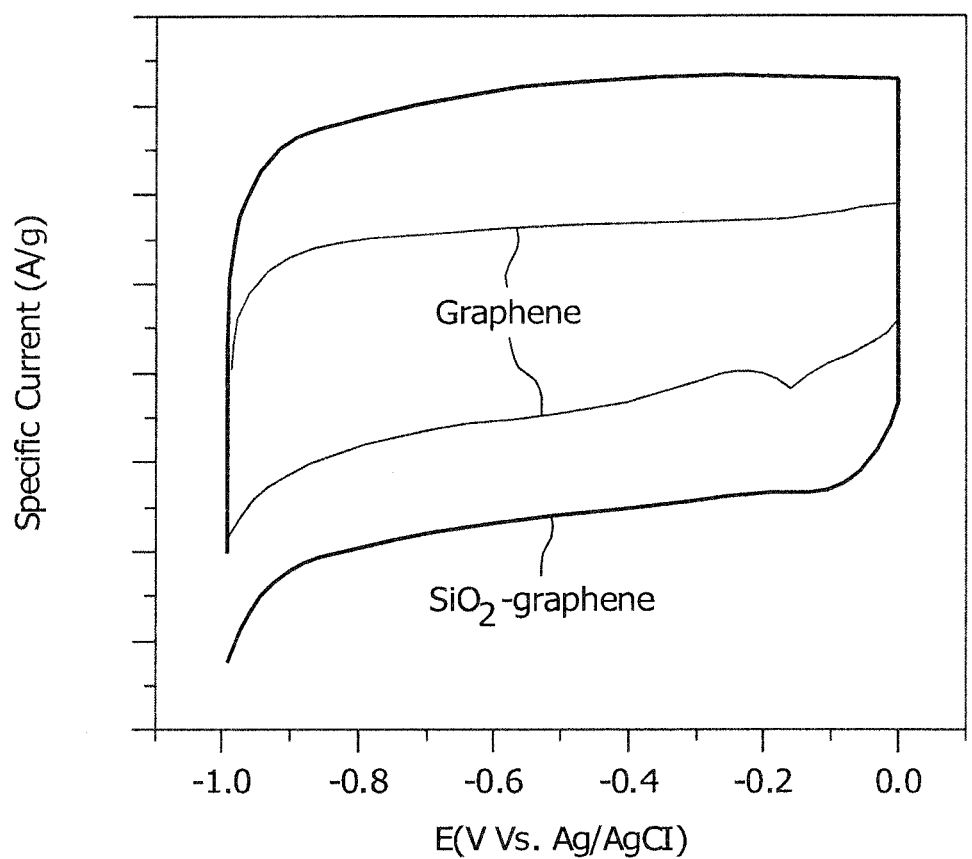

High surface area conductive materials with tailored porosity are useful in other energy storage devices such as electrical double layer supercapacitors. These experiments performed a preliminary study on the electrochemical capacitance of the mesoporous $SiO_2$-graphene nanocomposite powder. FIG. 7(f) shows cyclic voltammograms (CV) using a three-electrode configuration for pure graphene and a mesoporous $SiO_2$-graphene nanocomposite. Both graphene and the $SiO_2$-graphene nanocomposite display a capacitive charging current with a rectangular shape across the potential range between −1.0 and 0 V (vs. the saturated Ag/AgCl reference electrode). However, surprisingly the CV response for the nanocomposite with the "inert" silica is significantly enhanced, resulting in a much higher single electrode capacitance of 120 F/g. This value is better than the best result reported in the literature for graphene (about 100 F/g), but the actual specific capacitance for graphene in the nanocomposite is higher (170 F/g) if accounting for the 30 wt % of inert silica. These preliminary studies suggest the improved electrochemical response in the nanocomposites is likely attributed to the open mesoporous network, which prevents aggregation of the graphene sheets on the electrode.

Graphene sheets used in this study were prepared through the thermal expansion of graphite oxide. X-ray photoemission spectroscopy (XPS) of the graphene sheets shows a sharp C1s peak indicating good $sp_2$ conjugation.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with an electric device or fluid processing unit, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

The invention claimed is:

1. A method comprising:
    forming an ordered nanocomposite material by
        providing graphene layers having a first surface and a second surface, the graphene layers having thicknesses of 0.5 to 50 nm;
        dispersing the graphene layers with a surfactant in a suspension;
        adding a metal oxide precursor;
        precipitating metal oxide in a manner to form a self-assembled nanocomposite material having a plurality of ordered layers, at least two of the ordered layers consisting essentially of a metal oxide layer directly bonded to a first surface of a graphene layer, wherein the at least two ordered layers are bonded to one another such that the metal oxide layers and graphene layers are alternatingly positioned in the ordered layers.

2. The method of claim 1 wherein the graphene layers consist essentially of functionalized graphene sheets.

3. The method of claim 1 wherein the graphene layers consist essentially of 9 to 59 graphene sheets.

4. The method of claim 1, wherein the step of precipitating is maintained for about one to about 24 hours.

5. The method of claim 1 wherein the graphene and surfactant suspension further comprises water.

6. The method of claim 1 further comprising the step of heating the precipitate from 50 to 500° C. to condense the metal oxide on the graphene surface.

7. The method of claim 6 further comprising heating the precipitate from 50 to 500° C. to remove the surfactant.

8. The method of claim 1 further comprising the step of calcining the precipitate.

9. The method of claim 1 wherein the metal oxide is $M_xO_y$, and where M is Ti, Sn, Ni, Mn, V, Si, or Co, or is a combination thereof.

10. The method of claim 1 wherein the metal oxide is titania.

11. The method of claim 1 wherein the metal oxide is tin oxide.

12. The method of claim 1 wherein the metal oxide is mesoporous.

13. The method of claim 1 wherein the graphene layers have a carbon to oxygen ratio of 10-500:1.

14. The method of claim 1 wherein the nanocomposite material formed is an ordered three-dimensional superstructure having multilength and multiphase building blocks of the graphene layers and the metal oxide layers, and wherein the graphene layers in the superstructure have thicknesses of less than 20 nm.

15. The method of claim 1 wherein the surfactant is sodium dodecyl sulfate.

* * * * *

UNITED STATES PATENT AND TRADEMARK OFFICE
CERTIFICATE OF CORRECTION

PATENT NO.         : 8,563,169 B2
APPLICATION NO.    : 13/585741
DATED              : October 22, 2013
INVENTOR(S)        : Jun Liu et al.

Figure 3A:
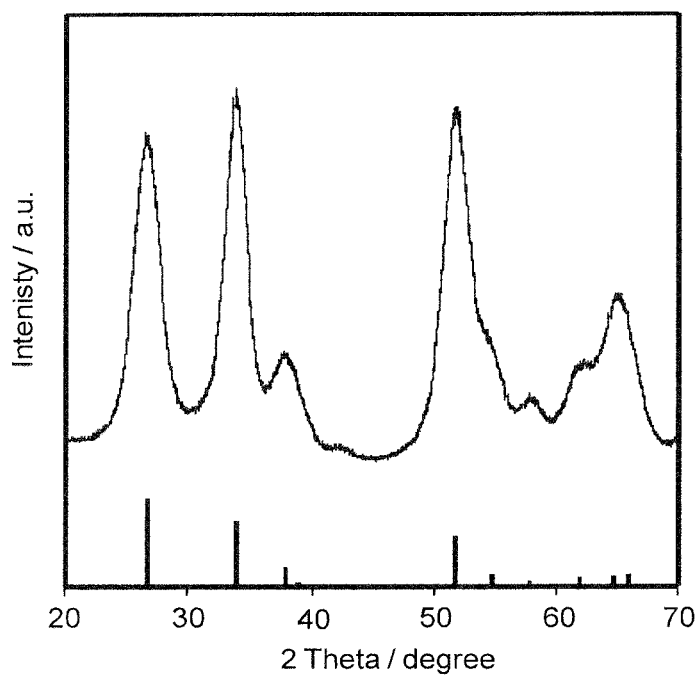
FIG. 3(a) is the XRD pattern of the $SnO_2$-graphene nanocomposite powder (15 wt % graphene). Standard reflection peaks of cassiterite $SnO_2$ (JCPDS No. 000-0024) are shown as vertical bars.
Figure 4A:
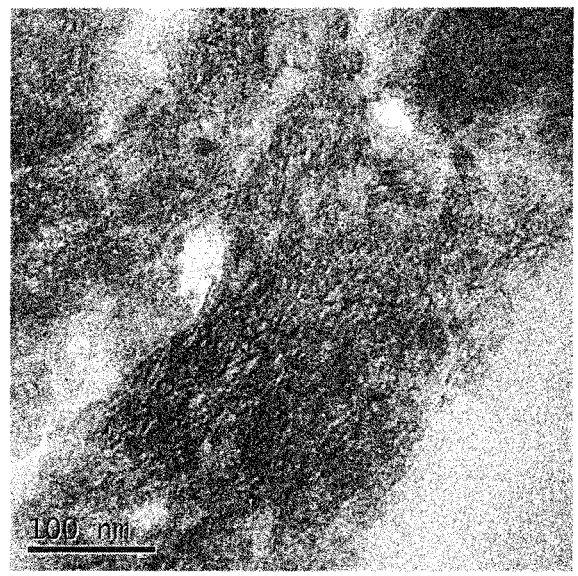
FIG. 4(a) is the cross-sectional TEM image of $MnO_2$-graphene nanocomposite paper showing layered structures.
Figure 4B:
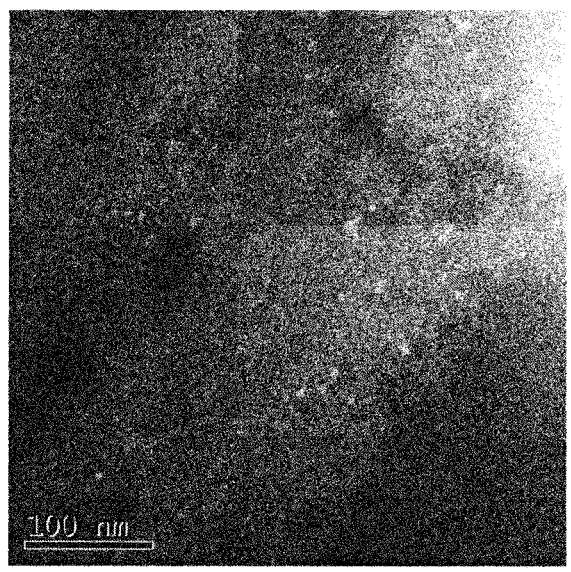
FIG. 4(b) is the corresponding dark-field TEM image of FIG. 4(a) showing isolated crystalline nanoparticles, indicating amorphous $MnO_2$ layers coated the graphene surface.

It is certified that error appears in the above-identified patent and that said Letters Patent is hereby corrected as shown below:

In the Drawings:

Sheet 7, FIG 3A, Left Heading, "Intenisty / a.u." should read --Intensity / a.u.--.

Figure 3B:
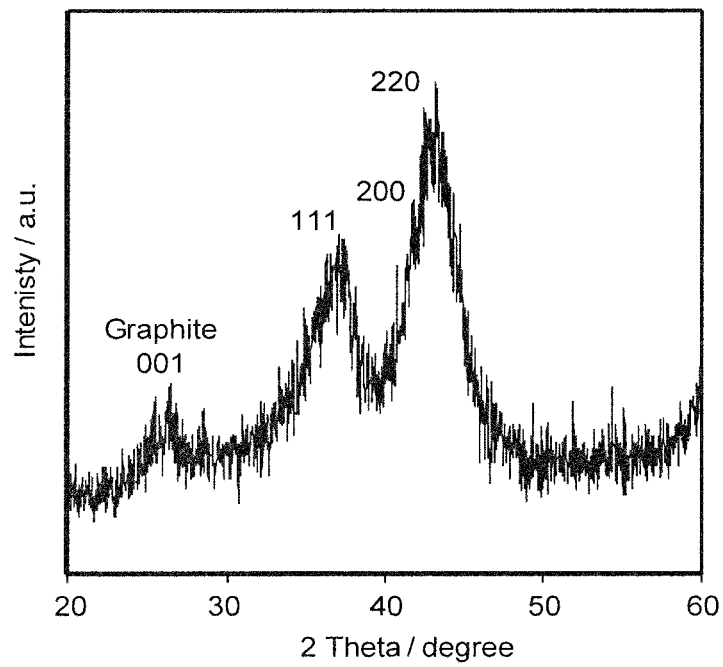
FIG. 3 (b) is the XRD pattern of the NiO-graphene nanocomposite paper showing reflection peaks of (111), (200) and (220) of crystalline NiO, as well as (001) reflection peak of multilayer graphene sheets.

Sheet 7, FIG 3B, Left Heading, "Intenisty / a.u." should read --Intensity / a.u.--.

Sheet 16, FIG 7FA, Bottom Heading, "E(V Vs. Ag/AgCI" should read --E(V Vs. Ag/AgCl--.

In the Specification:

Column 3, line 55, "400-2630 m2/g, and preferably 600-2630 m2/g," should read --400-2630 $m^2$/g, and preferably 600-2630 $m^2$/g,--.

Column 4, line 25, "400-2630 m2/g" should read --400-2630 $m^2$/g--.

Column 4, line 26, "600-2630 m2/g." should read --600-2630 $m^2$/g.--.

Column 5, line 26, "may selected" should read --may be selected--.

Column 7, line 14, "(4-5 mesoporous layer)" should read --(4-5 mesoporous layers)--.

Column 7, line 16, "wrinked graphene sheets." should read --wrinkled graphene sheets.--.

Column 7, line 56, "SnO$_2$-graphene nancomposites" should read --SnO$_2$-graphene nanocomposites--.

Column 8, line 2, "inventive scope is" should read --inventive scope are--.

Signed and Sealed this
Twenty-third Day of February, 2016

Michelle K. Lee
*Director of the United States Patent and Trademark Office*

CERTIFICATE OF CORRECTION (continued)
U.S. Pat. No. 8,563,169 B2

Column 8, line 47, "at 400 C" should read --at 400° C--.

Column 8, line 48, "at 400 C" should read --at 400° C--.

Column 8, line 62, "at 400 C" should read --at 400° C--.

Column 9, line 7, "at 400 C" should read --at 400° C--.

Column 9, line 14, "The sol" should read --The solution--.

Column 9, line 15, "the sol" should read --the solution--.

Column 9, line 38, "LIPF$_6$" should read --LiPF$_6$--.

Column 10, line 5, "of single" should read --of a single--.

Column 11, line 5, "a layered superstructures" should read --a layered superstructure--.

Column 11, line 45, "TEM image" should read --TEM images--.

Column 12, line 46, "mesoporus silica" should read --mesoporous silica--.